(12) United States Patent
Oligino et al.

(10) Patent No.: US 11,720,421 B2
(45) Date of Patent: *Aug. 8, 2023

(54) SYSTEMS AND METHODS FOR CALENDAR SYNCHRONIZATION WITH ENTERPRISE WEB APPLICATIONS

(71) Applicant: Nasdaq, Inc., New York, NY (US)

(72) Inventors: Dean Oligino, New York, NY (US); Dinesh Hegde, Bangalore (IN)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,154

(22) Filed: Sep. 15, 2022

(65) Prior Publication Data

US 2023/0049190 A1   Feb. 16, 2023

Related U.S. Application Data

(63) Continuation of application No. 15/400,705, filed on Jan. 6, 2017, now Pat. No. 11,449,368.

(30) Foreign Application Priority Data

Jan. 8, 2016   (IN) .............................. 201611000759

(51) Int. Cl.
  *G06F 9/54*   (2006.01)
  *G06Q 10/109*   (2023.01)
  (Continued)

(52) U.S. Cl.
  CPC ................ *G06F 9/542* (2013.01); *G06F 9/54* (2013.01); *G06Q 10/109* (2013.01); *G06F 8/34* (2013.01);
  (Continued)

(58) Field of Classification Search
  None
  See application file for complete search history.

(56) References Cited

U.S. PATENT DOCUMENTS

| 8,949,462 B1 | 2/2015 | Djabarov |
| 2007/0016646 A1 | 1/2007 | Tendjoukian et al. |

(Continued)

FOREIGN PATENT DOCUMENTS

WO   WO 2014/168502 A1   10/2014

OTHER PUBLICATIONS

Transmittal of International Search Report and the Written Opinion of the International Searching Authority for PCT Application No. PCT/US2017/012691 dated May 5, 2017.

(Continued)

*Primary Examiner* — Chat C Do
*Assistant Examiner* — William C Wood
(74) *Attorney, Agent, or Firm* — Nixon & Vanderhye, PC

(57) ABSTRACT

The described technology relates to integrating events electronically scheduled in enterprise web applications and other event management applications. An improved capability is provided for an event management application like, for example, Microsoft's Outlook™ to provide the user with additional useful information and/or resources associated with scheduled events such as, but not limited to, meetings. Improved capabilities are provided to the enterprise web application clients based upon integration with event applications such as Outlook. Embodiments use a unique identifier generated for an event scheduled in one application for associating corresponding event information in the second application, such that the scheduled event calendars in the first and second applications can be synchronized without duplicating the event information between the two applications.

19 Claims, 22 Drawing Sheets

(51) Int. Cl.
    *G06F 8/34*     (2018.01)
    *G06F 9/451*     (2018.01)

(52) U.S. Cl.
    CPC ........ *G06F 9/451* (2018.02); *G06F 2209/541* (2013.01)

(56) References Cited

U.S. PATENT DOCUMENTS

| | | |
|---|---|---|
| 2008/0027955 A1 | 1/2008 | May et al. |
| 2009/0248480 A1 | 10/2009 | Mikovsky |
| 2010/0100463 A1 | 4/2010 | Molotsi et al. |
| 2012/0084286 A1 | 4/2012 | Hubner et al. |
| 2012/0284637 A1 | 11/2012 | Boyer |
| 2014/0089833 A1 | 3/2014 | Hwang |
| 2014/0185417 A1 | 7/2014 | Zhao |
| 2014/0337097 A1 | 11/2014 | Farlie |
| 2015/0347209 A1 | 12/2015 | Lyubinin |
| 2015/0371155 A1 | 12/2015 | Saint-Just et al. |
| 2015/0378995 A1 | 12/2015 | Brown |
| 2017/0161166 A1 | 6/2017 | Shivaprasad |
| 2019/0248480 A1 | 8/2019 | Whitten, Jr. |

OTHER PUBLICATIONS

Intellectual Property Office of Singapore Search Repot—Appl No. 11201805693Q dated Nov. 21, 2019, 2 pages.
Intellectual Property Office of Singapore Written Opinion—Appl No. 11201805693Q dated Nov. 21, 2019, 6 pages.

FIGURE 12

SYSTEMS AND METHODS FOR CALENDAR SYNCHRONIZATION WITH ENTERPRISE WEB APPLICATIONS

CROSS REFERENCE(S) TO RELATED APPLICATION(S)

This application is a continuation of U.S. application Ser. No. 15/400,705, filed Jan. 6, 2017, which claims the benefit of priority of the Indian Patent Application No. 201611000759 filed on Jan. 8, 2016, the entire contents of which are incorporated herein by reference.

TECHNICAL OVERVIEW

The technology described technology relates to integrating scheduled event functions in enterprise web applications and other event management applications.

BACKGROUND

A corporation may deploy an enterprise software application ("web application") on one or more servers in its corporate network or other Internet-accessible computer, and enable all its employees and/or clients to access that application via the web. Web-accessibility of such applications provide employees and/or clients with the capability to access the application at any time and from anyplace having network connectivity.

Many enterprise web applications have their own requirements for organized events (e.g., internal meetings, client meetings, product/service demonstrations, etc.) requiring coordination between users of the web application. Thus, each such enterprise web application may have its own scheduled event configurations and/or event participant configurations.

It is also the case that many enterprise web application users use other event application clients, in addition to enterprise software applications discussed above. For example, event application clients such as Microsoft Outlook™ is used by numerous enterprises for email, event management (e.g., calendar management) and other functions such as contacts management.

Aspects of these separate event applications can be synergistically integrated with aspects of the enterprise web application in a manner that improve the capabilities of both. Thus, techniques are desired for integrating enterprise web applications and their event management components with other event management systems used by users.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to integrating scheduled event functions in enterprise web applications and other event management applications. The described technology provides a capability to improve the efficiency and accuracy by which events such as meetings are organized and conducted in a corporation. In some example embodiments, an improved capability is provided for an event application like, for example, Microsoft's Outlook to provide the user with additional useful information and/or resources associated with scheduled events. According to some example embodiments, improved capabilities are provided to the enterprise web application clients (e.g., Nasdaq's IR Insight™) based upon integrations with event applications such as Outlook. Embodiments may use a unique identifier generated for an event scheduled in one application for associating corresponding event information in the second application, such that the scheduled event calendars in the first and second applications can be synchronized without duplicating the event information between the two applications.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 12 illustrates a data entry window for editing an event, according to some example embodiments;

DETAILED DESCRIPTION

Figure 1:
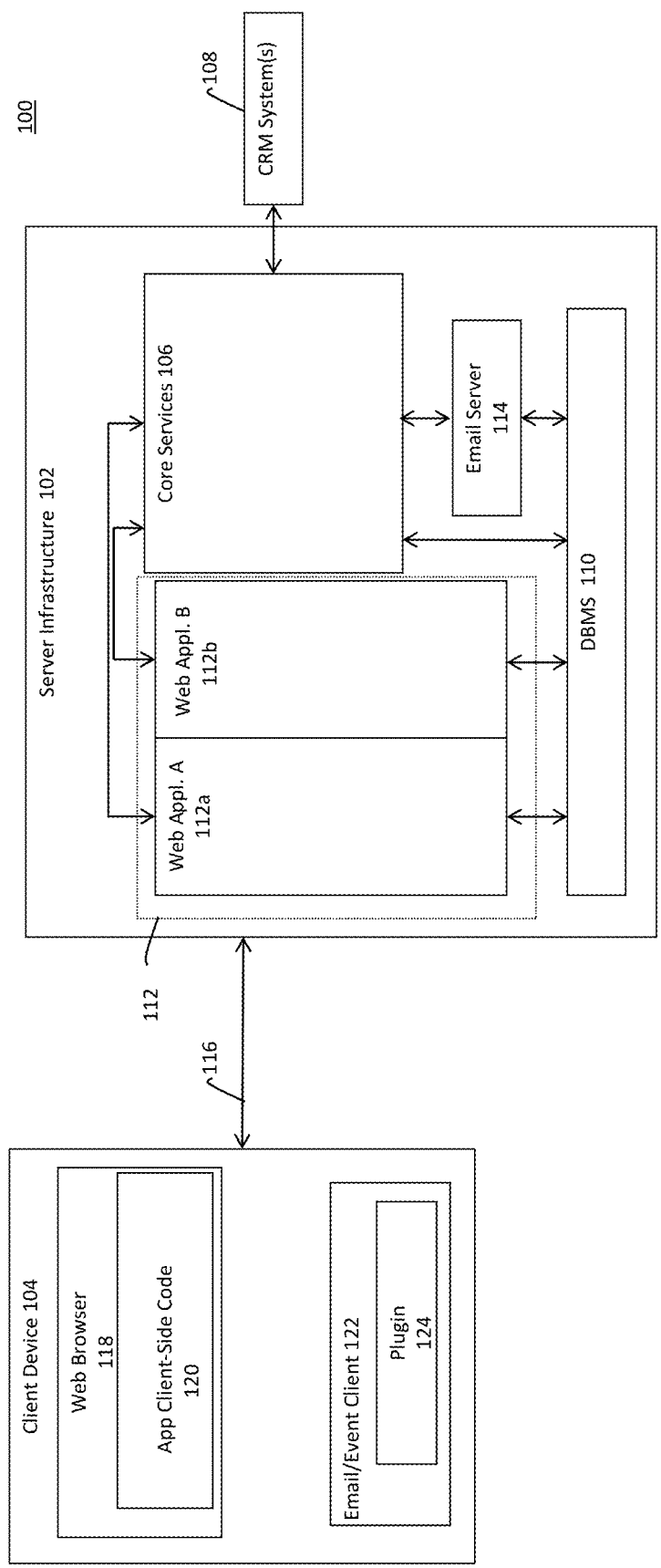
FIG. 1 illustrates a computing environment having one or more client devices configured to execute one or more of an event application client and a web application client, and one or more server devices executing web applications server components, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, integrating organized event related functions in enterprise web applications and other event management applications. The described technology may improve the efficiency and accuracy by which organized and/or scheduled events such as, but not limited to, meetings are organized, conducted and followed-up in an enterprise. In some example embodiments, an improved capability is provided for an event management application like, for example, Microsoft's Outlook™ to provide the user with additional useful information and/or resources associated with scheduled events in an enterprise web application like, for example, Nasdaq's IR Insight™. According to some example embodiments, improved capabilities are provided to the enterprise web application clients based upon integrations with event management applications such as Outlook™.

Example embodiments achieve the desired integration between the calendar of an event management application and the scheduled event list of an enterprise web application, without unnecessarily duplicating event information stored in the event management application and enterprise web application. Instead of duplicating event information between the event management application and the web application, some example embodiments may a store a link in the event information of one to the corresponding event information in the other, so that the link can be resolved at runtime to obtain and display the necessary event information during runtime according to actual use. Moreover, example embodiments maintain the security associated with the various integrated applications by ensuring that the information of events provided by an enterprise web application is displayed in the integrated calendar for a user only if that user is concurrently logged in to the enterprise web application.

Thus, embodiments of the present invention provide techniques for addressing a problem caused by having multiple applications by which events are electronically scheduled. With highly connected corporations of today where each employee may interact with multiple enterprise applications where the user may commit to scheduled events in several of the multiple enterprise applications, embodiments provide for efficiently synchronizing and integrating the information related to scheduled events so that a user can get a better view of his scheduled commitments.

Description of FIG. 1

FIG. 1 illustrates a non-limiting computing environment 100 including one or more servers 102 (also referred to herein as "server infrastructure") and one or more clients 104, according to some embodiments. The one or more servers 102 communicate with clients 104 and one or more external servers, so that users on client devices 104 can access web applications 112 (also referred to as "enterprise web applications") executed on the one or more servers 102. Servers 102 may also communicate with one or more internally used systems such as, for example, a document management system 108. The communication between the servers 102, clients 104, and document management system 108 may be over the internet or any other communication network. For example, the communication 116 between the one or more clients 104 and server infrastructure 102 may be over the internet.

Servers 102 may be implemented on one or more physical server computers that are communicatively connected to each other over a network. The one or more physical server computers may be geographically co-located or distributed. Servers 102 may include a database management system 110 and one or more server-side web applications 112 (e.g., 112a and 112b) and a core services application 106.

Each web application 112 may be designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of each web application 112 provides the processing logic for the application, and the database of each web application 112 provides for storing and reading data.

Web applications 112 may interact with the core services application 106 for managing user authentication, with client 104 for receiving input from and for transmitting out to, and the database management system 110 for obtaining information to be provided to the requesting client applications running on clients 104. In some embodiments, some or all of the information provided to requesting clients may be generated by the web application itself and/or other web application executing locally on the same one or more servers 102.

Core services application 106, which may also be designed and operated according to the three-tier model described above, may provide one or more services that are commonly used by the web applications 112. Example services that may be provided by core services application 106 include authentication of users, management of sessions, etc.

Web applications 112 operate to receive requests from clients 104, perform processing and/or obtain information from the database 110 and/or external servers (not shown), and respond to clients 104 with a result from the processing and/or obtained data. Web applications 112 may utilize core services 106 for administering users, user sessions and/or external server sessions. In some embodiments, web applications 112 may, in response to requests from a web application client on a client device 104, may interact with email server 114 to provide information regarding one or more scheduled events and/or scheduled event participants.

A web application may comprise one or more client-side components and one or more server-side components. Client-side components of a web application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client device requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 110 (sometimes also referred to herein simply as the database), may be a commercially available DBMS, or other data record management system. Although shown as a single DBMS, DBMS 110 may include one or more separate databases. Embodiments are not limited to any type of database management system.

Client 104 can be configured to execute the same or different client applications. In the illustrated example embodiment in FIG. 1, client 104 includes a web browser 118. Client 104 may also have stored on it a client-side app 122 which may be a native app for email/event management. An example email/event management application (also referred to as "event application") is Microsoft's Outlook™, but the use of other email/event management application clients (e.g., Google Mail™ and Google Calendar™ from Google™, Yahoo Mail™ and Yahoo Calendar™ from Yahoo™, etc.) is contemplated as embodiments of the invention. The client-side app 122 may include one or more "plugin" 124 that implements at least some of the functionality required for interaction with server 102. When browser 118 is used to access a web application 112, client-side code 120 for a web application 112 executed within browser 118. The client-side code 120 may perform client-side processing for a corresponding web application on server 102.

As illustrated in FIG. 1, when a web application client 118 communicates with a web application 112, the web application 112 may obtain any information requested by the client from one or more external servers (not shown) and/or database 110 and provide to the client application. In some embodiments, some or all of the information provided to the requesting clients 104 may be generated locally by servers 102.

Clients 104 may include personal computers, mobile computers, tablets, smartphones, and other electronic devices. In some example embodiments, any electronic computing device including at least a display, an input device for user input, and a communication interface for communicating with the server device may operate as a client device.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 22, as well as in other places in this document.

In an example implementation, the computing environment 100 may be associated with an enterprise, such as, for example, Nasdaq Corporation. Example web applications 112 may include real-time market analysis applications (e.g. IR Insight™) and a client account status application. Users of web applications 112 may include financial analysts and/or other employees of the enterprise. Core services application 106 may provide common services such as administration (e.g., creating user accounts, administering entitlements, etc.) authentication (e.g., create/manage sessions for users to access certain services, etc.) and authorization (e.g., check whether user is entitled to access certain services or features, etc.) for users. Core services application 106 may, among one or more other processes, include an interface for interacting with one or more event management servers, such as email server 114. Web applications 112 may interact with email server 114 either directly or indirectly via core services 106.

Servers 102 may represent one or more servers and the associated infrastructure used by the enterprise for running web applications 112, core services application 106 and associated software, and email server 114. The document management system 108 may include a customer relationship management application that communicates with the web applications and/or core services application for delivering services to the enterprise's users.

When an analyst using client 104 accesses the real-time market analysis application on servers 102, an SPA may be displayed on the client device, and various real-time or value-added information from the vendors (e.g., such as those operating external servers) and/or the corporation's internal analysts etc., can be displayed in the one or more portions of the displayed SPA. The SPA may have, as one component displayed, information regarding a calendar and/or one or more upcoming scheduled events involving the user.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 22.

Figure 2:
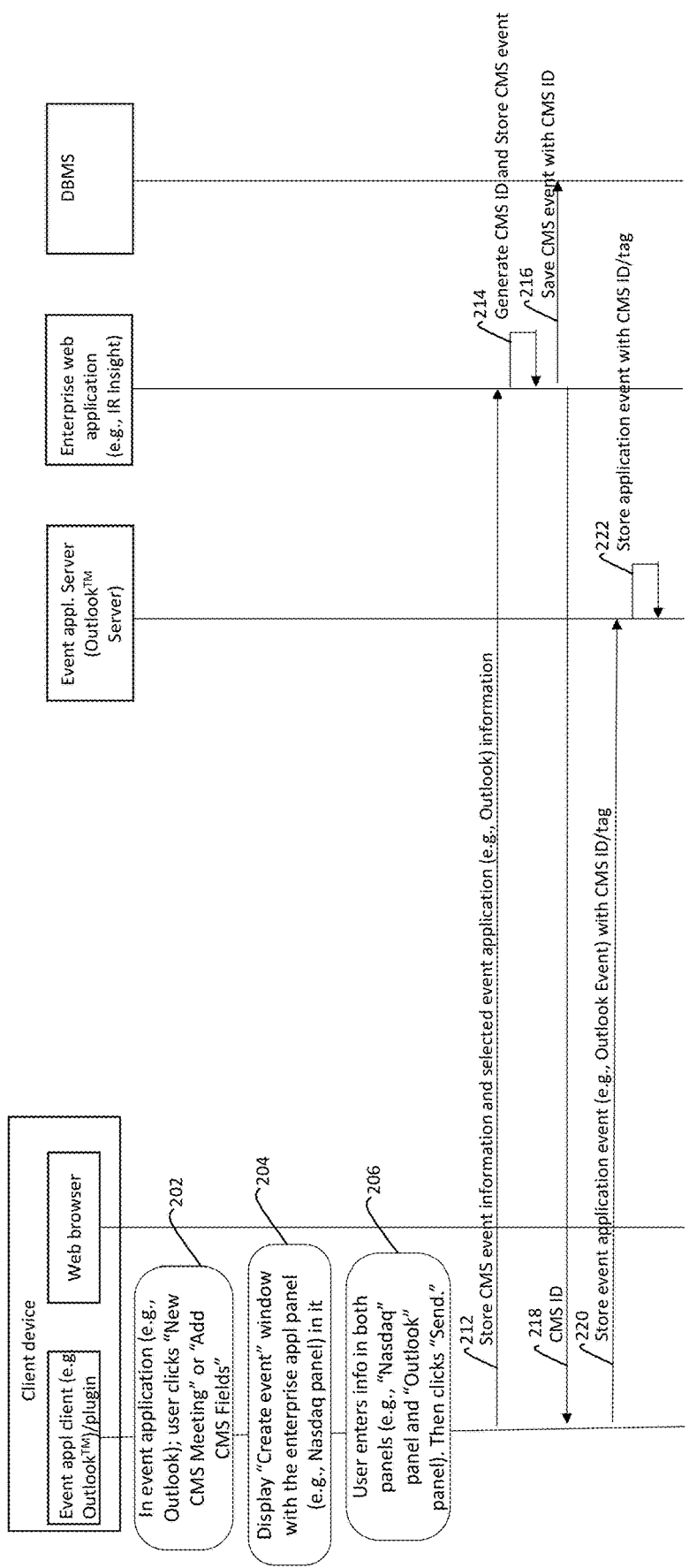
FIG. 2 illustrates example activity flow when the event application client is used to create an event in a computing environment similar to that shown in FIG. 1, according to some example embodiments.

Description of FIG. 2

FIG. 2 illustrates example activity flow when the event application client is used to create a scheduled event in a computing environment similar to that shown in FIG. 1, according to some example embodiments. For example, a user on a client device 104 may use an Outlook™ client to create a new scheduled event.

The event application client, configured for integrating with a CMS component of a web application (e.g., a contact management component of an enterprise web application such as, for example, IR Insight by Nasdaq), may provide the user with options (e.g., shown in FIGS. 3A and 3B) for initiating the creation of an event at operation 202. As shown in toolbar 302, an Outlook client may provide a "New CMS Meeting" option which enables the user to create an Outlook-CMS meeting or other scheduled event. The toolbar 304 shown in FIG. 3B enables the user to add CMS aspects to an already existing Outlook meeting or other scheduled event. According to some embodiments, the term "Outlook-CMS" is used to refer to a meeting or other scheduled event scheduled by the Outlook client, to which CMS aspects (e.g., IR Insight) are added. For example, after CMS aspects are added to an Outlook meeting, that meeting may be identified as an Outlook-CMS meeting. More generically, a scheduled event which integrates aspects from an event application and a web application may be identified in the following as an "event application—web application scheduled event" or equivalently as an "event application—CMS scheduled event".

Figure 4:
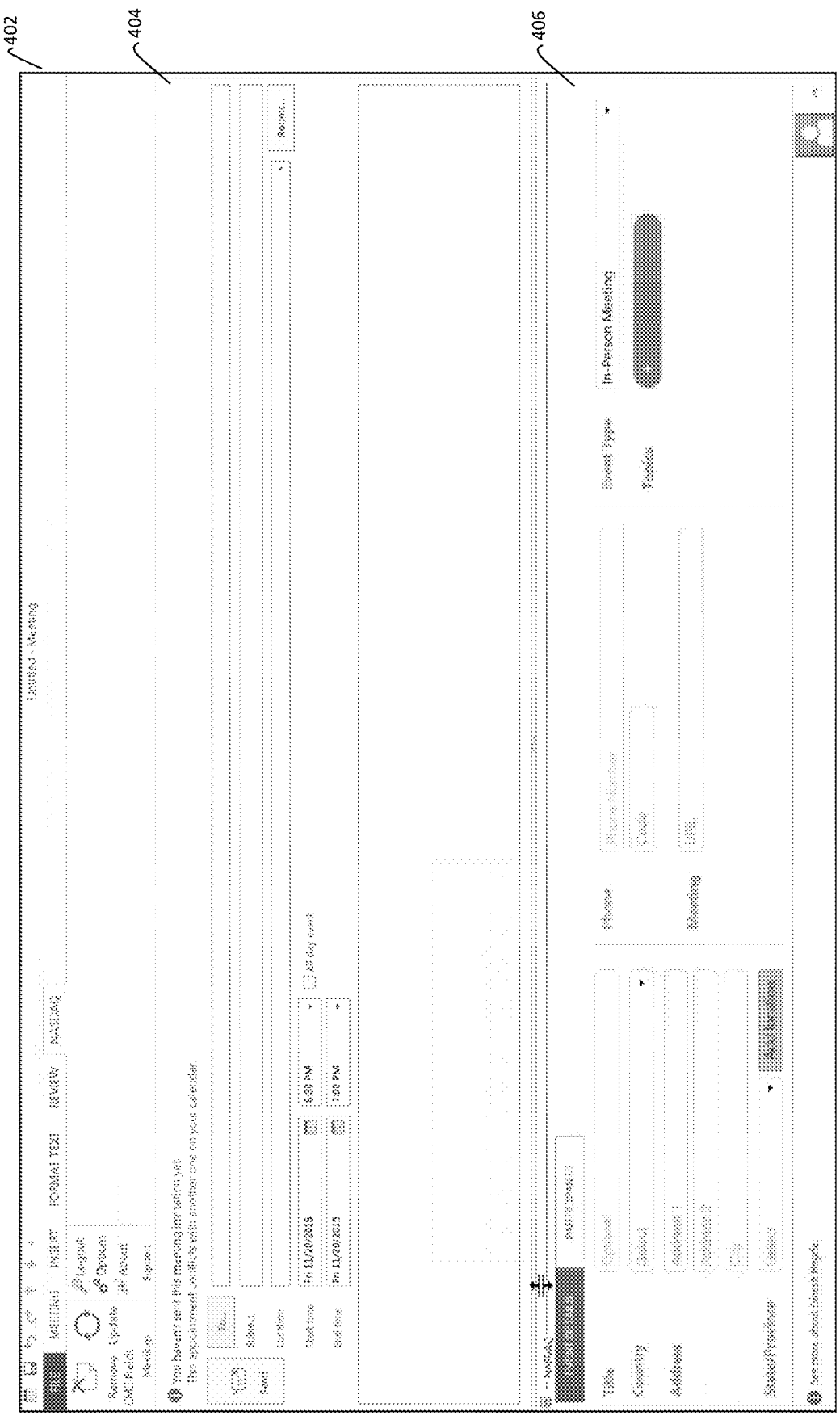
FIG. 4 illustrates a data entry window for creating an event, according to some example embodiments.

According to some embodiments, after either the "New CMS Meeting" or "Add CMS Fields" is selected, a window similar to window 402 shown in FIG. 4 may be displayed at operation 204. Window 402 enables the user to enter the requisite event application information in an event application panel (e.g., Outlook information in an Outlook panel 406) and CMS information in a CMS panel 408 (also referred to herein, in some embodiments, as the "Nasdaq panel" or more generically as "web application panel").

When satisfied with the entered information at operation 206, the user can proceed to save the event information such that it will be in the event application calendar (e.g., Outlook calendar) and would also appear in the enterprise web application event information.

At operation 212, the "plugin" integrated with the event application client (e.g., Outlook client) transmits the information entered in the CMS panel to the enterprise web application. For example, the information entered in the CMS panel may be collected by the Outlook client and/or its plugin and transmitted to the server component of the enterprise web application (e.g., IR Insight on the server). The transmitted information may also include selected information from the event application panel (e.g., Outlook panel). In an example embodiment, the date, time, subject and location of the scheduled event as specified in the Outlook panel is transmitted to the enterprise web application on the server.

The enterprise web application, at operation 214, generates a CMS ID, which is a unique identifier to identify the event in the enterprise web application. It then stores, at operation 216, the CMS event information in association with the CMS ID. The CMS information may be stored in the DBMS 110.

The CMS ID is returned to the event application client at operation 218.

At operation 220, the event application client Outlook client transmits the information from the event application panel to the event application server (e.g., Outlook client transmits the information from the Outlook panel to the Outlook server). The CMS ID is included in the transmitted information to the event application server.

Upon receipt of the information from the client, at operation 222, the event application server stores the information for the event application event in the server and/or a DBMS (e.g., DBMS 110). The event application event (e.g., Outlook event) information is indicated as belonging to a predetermined event category (e.g., CMS event type) and the CMS ID is stored along with the Outlook event information. According to example embodiments, there may be one or more event types for which a CMS ID is generated. In order to minimize data duplication, some example embodiments does not store any information obtained from the web application panel with the event application event information in the same area of memory.

In some embodiments, the event application client and/or the event application server may transmit notifications to registered users of the event application who are also participants in the scheduled event. In some embodiments, notifications regarding the event for the event application may also be sent to persons who are not participants. Notifications regarding the event for the event application may be transmitted when or in association with the event information being stored by the event application server. In addition to the transmitting of notifications regarding the scheduled event in the event application, or alternatively, in some embodiments notifications may be provided to participants in the scheduled event in the web application. The notifications to participants in the web application scheduled event may be transmitted when the corresponding event information is stored. The participant lists for the same scheduled event from the event application and the web application may be different. For example, in some embodiments, one or more participants in the scheduled event may be present only one of the event application or the web application.

It should be noted that the event application server (e.g., the Outlook server), according to one or more example embodiments, does not store the CMS event information other than for the CMS ID. The CMS ID is subsequently used in order to access the CMS information associated with respective event application events (e.g., Outlook events) at runtime. The runtime access may be in order to access the information from the web application to be displayed in association with the scheduled event in the event application calendar. By, in contrast to many conventional calendar application which synchronizes different calendars by duplicating information between each of the different calendars, embodiments more efficiently perform integration by only storing a link in the event application to corresponding event information in the web application.

It should also be noted that, at least in some example embodiments, the web application panel is displayed or otherwise made available to the user only if the user is concurrently properly authorized or logged into the web application. According to some embodiments, for example, the web application server may reject requests from the event application client for retrieving or storing event information related to the web application unless the user is currently logged into the web application or has previously, by configuration, been authorized to access the event information without login.

Description of FIG. 3

Figure 3A:
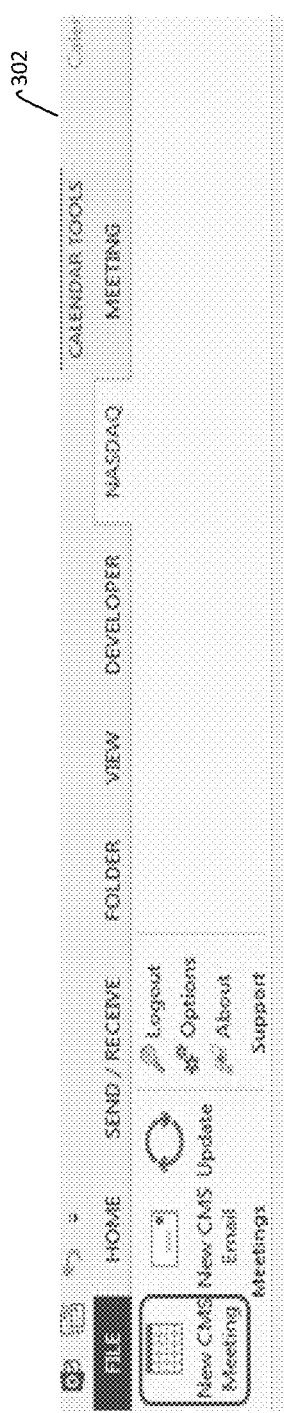
FIGS. 3A and 3B (collectively "FIG. 3") illustrate toolbar options for initiating creating an event, according to some example embodiments.
Figure 3B:
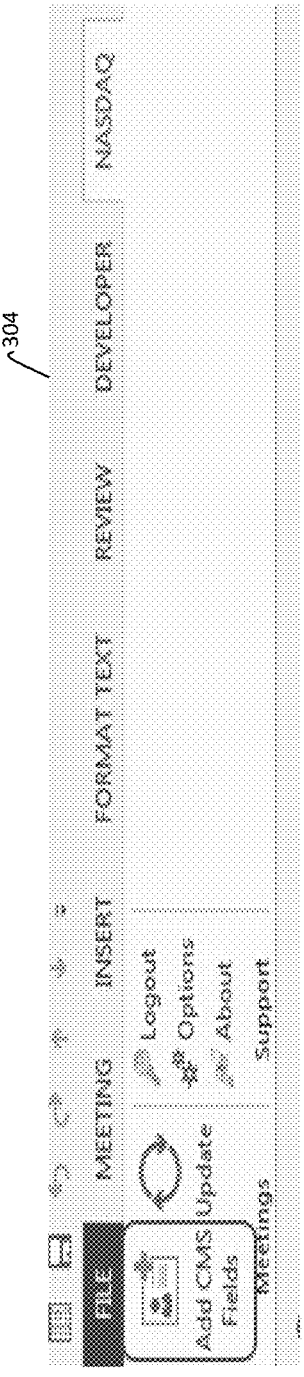

As noted above, FIG. 3 (FIGS. 3A and 3B) illustrates toolbar options for facilitating the creation of an event in FIG. 3A and for facilitating the changing of an event application event to an event application-CMS event or the addition of CMS field in FIG. 3B, according to some example embodiments.

Description of FIG. 4

Also as noted above, FIG. 4 illustrates data entry window 402 for creating a scheduled event, according to some example embodiments. Data entry window 402 includes a data entry panel for the event application (e.g., Outlook panel) 404 and a data entry panel for the enterprise web application (e.g., IR Insight panel) 406. Window 402 may also include a toolbar for facilitating operations. Panels 404 and 406 may be arranged as shown in FIG. 4, or alternatively may be arranged in any other manner, such as, for example, so that overlap with each other, horizontally tiled, etc.

The event application panel 404 is for providing information to (and/or to display information from) the event application (e.g., Outlook). Panel 404 may include data entry fields for specifying meeting start and end dates and times, for specifying a subject, for specifying a location, for specifying a listing of participants, etc. Some of the data entry fields may be for providing the requisite information in unverified free form, while some other data entry fields may have their inputs verified. For example, the location may be specified in free form and the user may specify the location as any string. The entered location entered via panel 404 may be stored without being subjected to verification whether the location is indeed a valid location. The date and time of the scheduled event entered through panel 404 may be verified for validity, by checks, such as checks ensuring that the meeting start date and time precedes the end data and time. Each participant specified through panel 404 may be verified against a pre-existing list of potential participants. For example, each participant may be required to be in the Outlook contact list of the user scheduling the event.

Where the event application integrates event management functions with contact management functions and/or email functions, panel 404 may include items for leveraging such integration. For example, a send button in panel 404 can be used to email information related to the scheduled event to each of the specified participants. Upon user selection of the send button, if at least a minimal set of information has been specified, the event may be scheduled and each of the participants informed via an email message. A minimal set of information may be a valid event start and end date/time, and at least one participant. As discussed elsewhere the scheduling of the event may include storing related information in a storage and associating event application event information with stored event information from the enterprise web application.

The web application panel 406 is for providing information to (and/or to display information from) the enterprise web application (e.g., IR Insight). Panel 406 may include data entry fields for specifying additional data such as more detailed event location information. For example, panel 406 may include data entry fields for specifying street address, city, state, and country such that verification of whether the specified location is a valid location is facilitated. Data entry fields for other information such as, for example, additional and/or alternative title information, one or more phone numbers associated with the event (e.g., a call-in number for participants), URL information for accessing the event and/or event materials, type of event, and one or more topics associated with the event. In some example embodiments, the user input in at least some of the data entry fields in panel 406 are checked for validity, and only the information that passes the validity test is stored in relation to the event.

The displaying of the event application panel 404 and the web application panel 406 simultaneously in window 402 facilitates a convenient way for the user to view a scheduled event with related information from two different applications on the same page or screen. As described elsewhere in this document, however, some embodiments may prevent the displaying of the web application panel 406 when the user is not logged in to the second application.

The enterprise web application, in some example embodiments, may utilize information from one or more verified data fields to determine associations between scheduled events. For example, by providing for granular specification of event location, the enterprise web application facilitates determining events arranged in the same geographic areas and/or geographic coverage of events, so that such relationships can be leveraged for providing additional services, etc.

Window 402 may provide for converting an event application event to an event application-enterprise web application event, and/or for converting an event application-enterprise web application event to an event application event or an enterprise web application event. For example, toolbar buttons such as a "Remove CMS Fields" button may be used to remove CMS information associated with the event. A button "Add CMS fields" may be used for converting an event application-enterprise web application event to another type of event.

Figure 5:
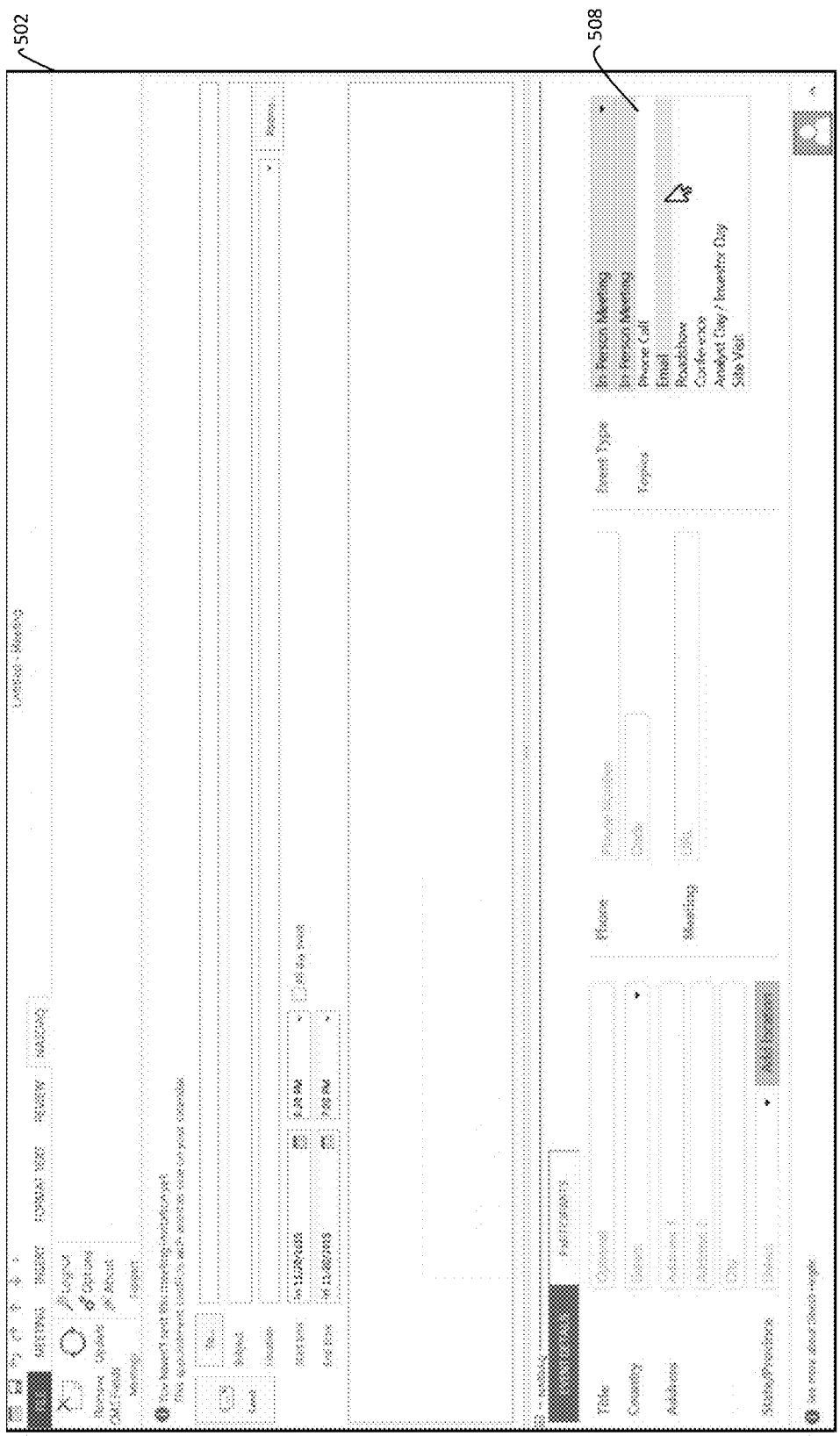
FIG. 5 illustrates a data entry window for creating an event with a pull-down window for selecting an event type, according to some example embodiments.

Description of FIG. 5

FIG. 5 illustrates a data entry window 502 for creating an event with a pull-down window for selecting an event type, according to some example embodiments. As shown in window 502, as part of the information provided as enterprise web application event information, the event type may be specified as any of the options in pull-down menu 508. Example event types may include in-person meetings, phone call, email, roadshow, conference, analyst day/inventor day, site visit, etc. In some embodiments, one or more other data entry fields will be dynamically determined and presented in panel 502 based on an event type selected.

Figure 6:
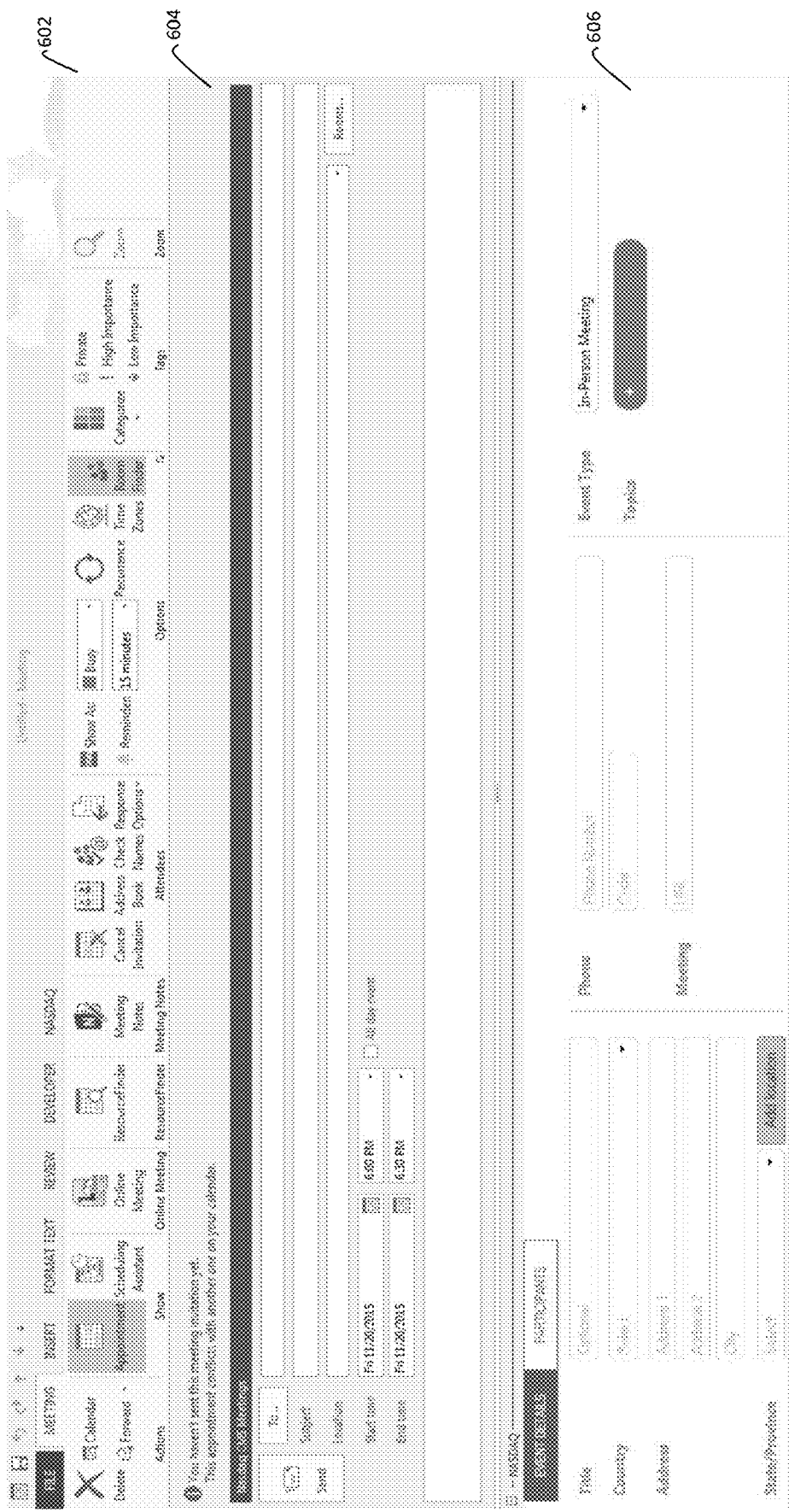
FIG. 6 illustrates a data entry window for creating an event, according to some example embodiments.

Description of FIG. 6

FIG. 6 illustrates a data entry window 602 for creating an event, according to some example embodiments. The event application panel 604 (e.g., Outlook panel) may indicate that the event being setup is a CMS type of meeting. The pull-down menu discussed above in relation to FIG. 5 may include a listing of types of meetings available in the web application. In some embodiments, regardless of the type of meeting selected in the CMS meeting type, the Outlook meeting type may be a "CMS Meeting". For example, as shown in FIG. 6, although the CMS event type is set as "in-person meeting" in the enterprise web application panel 606, the event application panel 604 displays a "CMS Meeting". In other embodiments, the event application may include the subcategories of the CMS meeting type.

Figure 7:
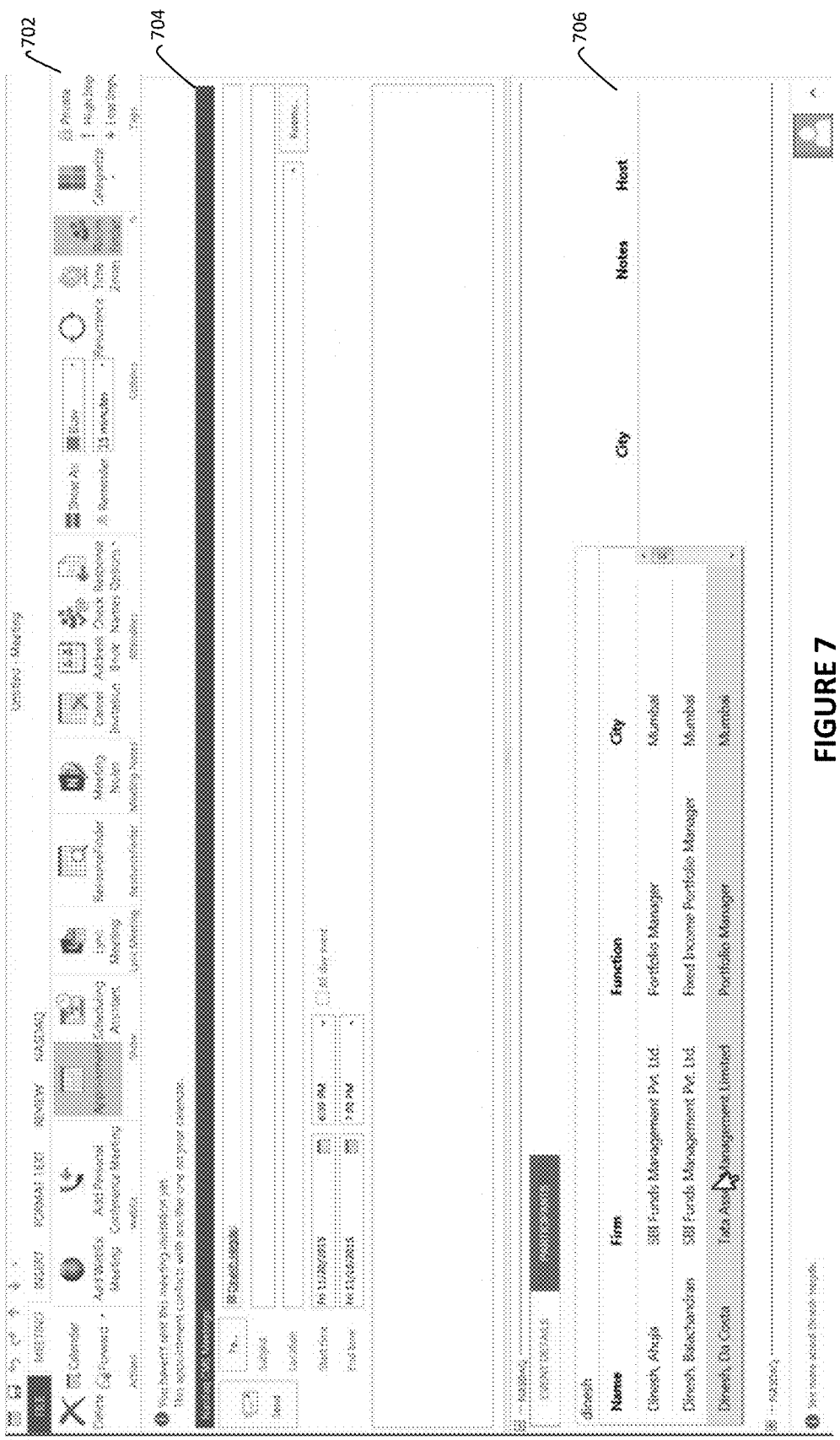
FIG. 7 illustrates a data entry window for creating an event with a pull-down window for selecting participants, according to some example embodiments.

Description of FIG. 7

FIG. 7 illustrates a data entry window 702 for creating an event with a pull-down window for selecting participants, according to some example embodiments. For example, as shown in FIG. 7, a pull-down list may be populated with names of users of the web application. The list may be for a subset of all of the users of the web application. For example, the subset may be users who have previously expressed an interest in the type of meeting, a group of users in the same administrative division as the user scheduling the event, etc. The pull down list, in order to facilitate selection of persons, may include information such as, but not limited to, the name of a person, an administrative division or group associated with the person, work title or function of the person, city in which the person is registered as located, notes associated with the user, and/or whether or not the person can operate as the host of the event. In some example embodiments, the pull down list may list persons who have associated with them a city that is the same as, or which is in proximity to, the location of the event. The location of the meeting may be determined based upon the event application information (e.g., from panel 704, a city may be determined from the provided free form location information) or from enterprise web application event information (e.g., from panel 706, a city specified as a separate data entry field may be associated with the event).

Figure 8:
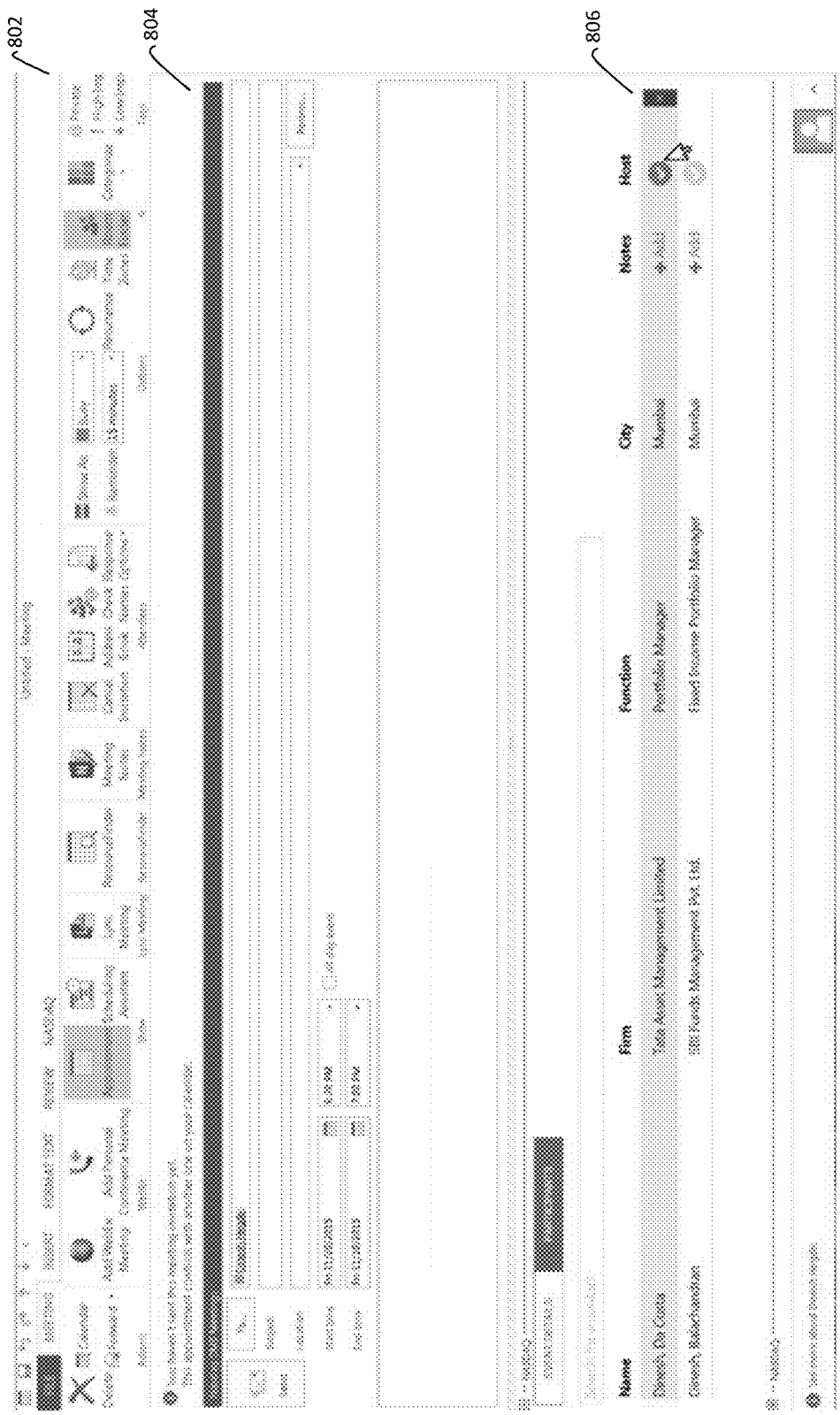
FIG. 8 illustrates a data entry window for creating an event with a host specified, according to some example embodiments.

Description of FIG. 8

FIG. 8 illustrates a data entry window 802 for creating an event with a host specified, according to some example embodiments. In the illustrated window, a host is selected from among the CMS participants (participants defined in the enterprise web application panel 806. A pull down list of CMS participants is presented, and one of the participants in the list can be marked as the host. Some embodiments may include functionality to only selectively enable the choice to be selected as host, according to some predetermined criteria. The pull-down list may be configured such that for one or more of the participants, it may be indicated whether there are any notes already added and/or the ability to add a note. The event application panel 804 may indicate that the event being currently configured is an event application—web application event (i.e., an event for which certain web application aspects have been associated) or whether it is an event application only event.

Figure 9:
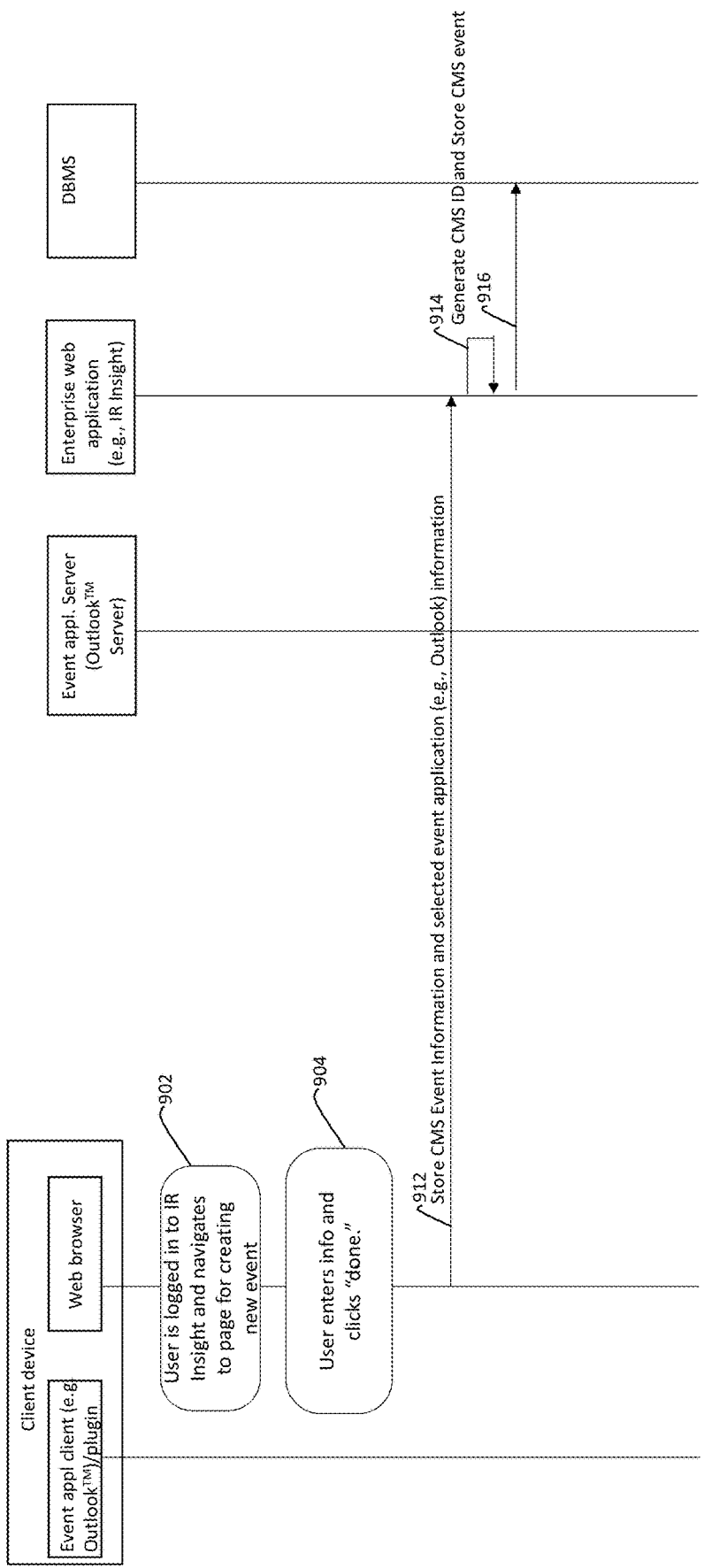
FIG. 9 illustrates example activity flow when the web application client is used to create an event in a computing environment similar to that shown in FIG. 1, according to some example embodiments.

Description of FIG. 9

FIG. 9 illustrates example activity flow when an enterprise web application client, such as IR Insight client, is used to create a scheduled event in a computing environment similar to that shown in FIG. 1, according to some example embodiments.

As shown in FIG. 9, the user logs into the web application at operation 902 and navigates to a page for creating a new scheduled event. The event information is entered in the web application event create screen, such as the example screen 1002 shown in FIG. 10.

After the user enters the event information at operation 904 and commands the event to be created, at operation 912, the web browser 118 and/or web application client 120 transmits the event information to the web application in order to be saved. For example, an IR Insight client 120 may transmit the event information to IR Insight server component 112.

At operation 914, the web application generates a CMS ID and stores (operation 916) the CMS event in association with the generated CMS ID. The generation of the CMS ID and the storing of the event information in association with the CMS ID may be performed in a manner similar to that described above in relation to corresponding operations shown in FIG. 2.

In the example embodiment shown in FIG. 9, the new event created does not immediately cause any processing to be performed by the event application client or event application server. As described below, such scheduled events are stored in a storage, and are processed by the event application components subsequently in accordance with a synchronization operation.

Figure 10:
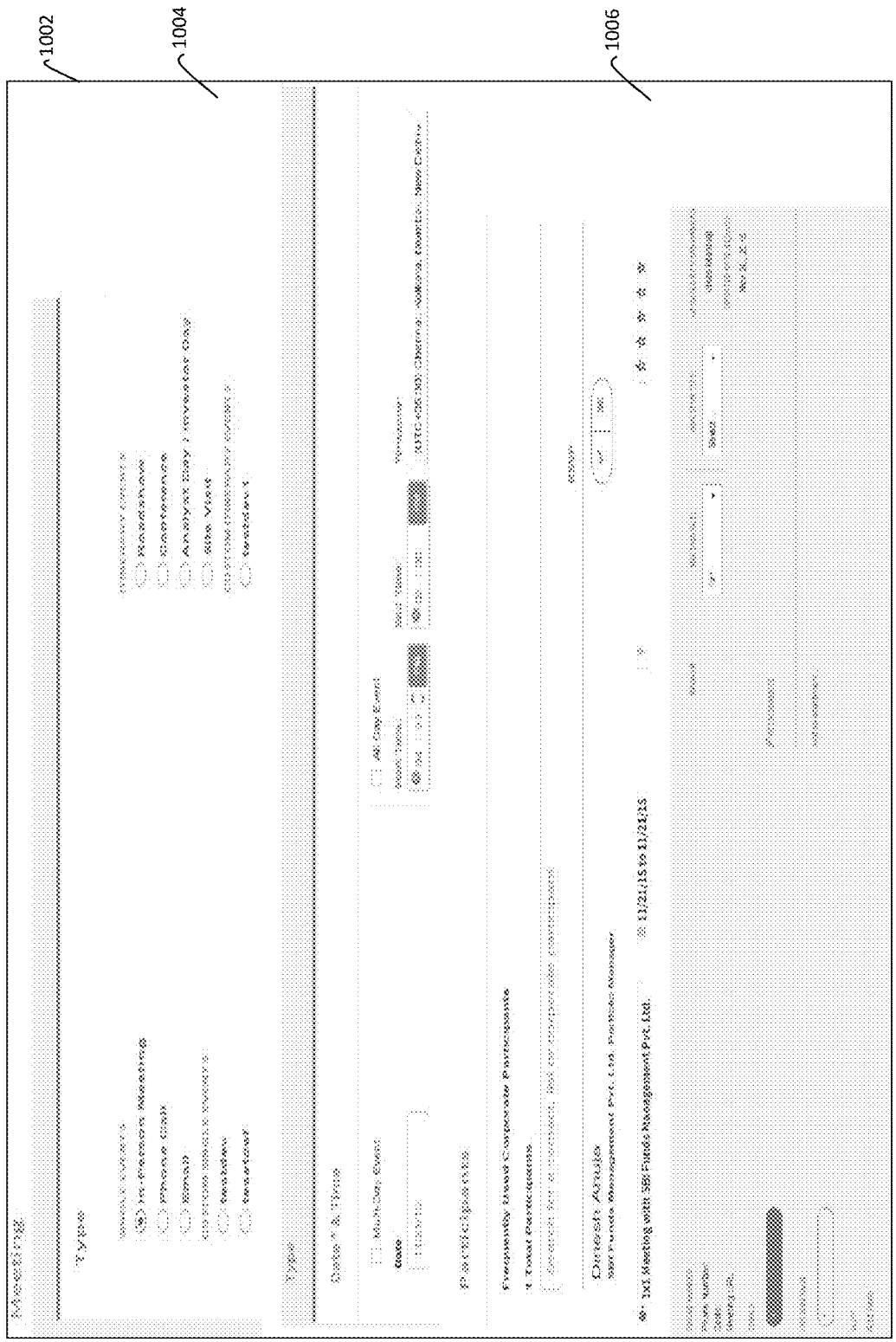
FIG. 10 illustrates a data entry window for creating an event, according to some example embodiments.

Description of FIG. 10

As noted above, FIG. 10 illustrates a data entry screen 1002 for creating an event from an enterprise web application, according to some example embodiments. Data entry screen 1002 may provide for the event to be identified as one of several types of event types. The event type may be indicated by selecting from a predetermined list of event types or by entering a custom event type name.

Screen 1002 may provide for indicating whether the event is a multi-day event, all day event, and the start/end dates and times. In some embodiments, a data entry field may be provided for indicating the time zone associate with the specified start/end times.

Screen 1002 may also provide for looking up web application registered users as participants in the scheduled event. It may be provided for displaying a frequently used participant list from which the user can quickly select one or more persons as participants in the event being currently scheduled.

A title for the event may be specified. Additional information such as phone number and codes for the event, one or more URLs associated with the event, types of participants for the event (e.g., a type of investor etc.), a categorization of event size (e.g., number of participants), topic(s) to be discussed, custom tags associated with the event, can be specified via respective data entry fields. When this information is stored, in some embodiments, the last person who changed event information and the date and time at which the last change to the event information was effected, may be stored that the information is available to be when the event information is subsequently displayed. Provision may also be made for specifying free form information in relation to the event in the form of notes.

Figure 11:
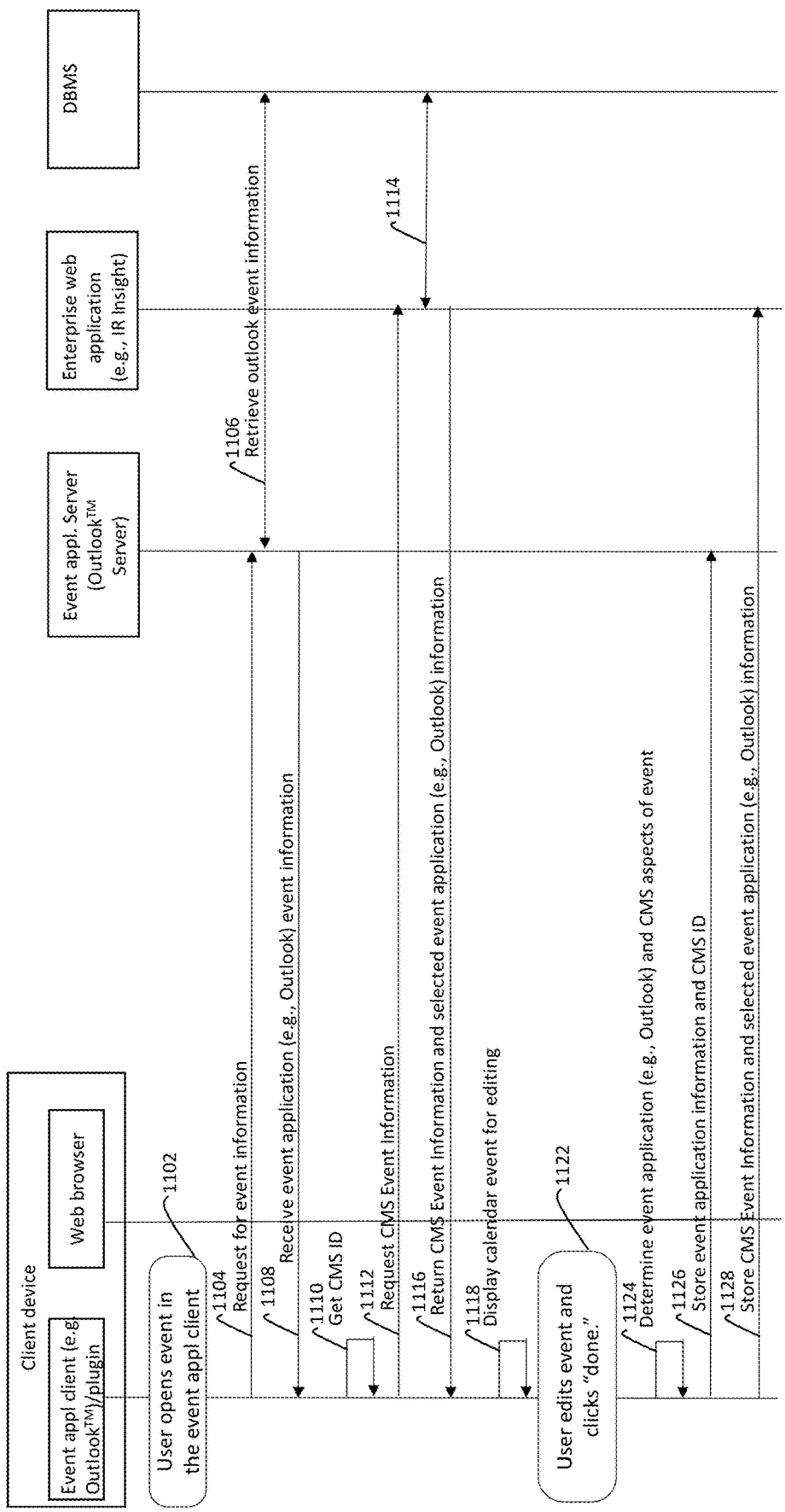
FIG. 11 illustrates example activity flow when the event application client is used to edit an event in a computing environment similar to that shown in FIG. 1, according to some example embodiments.

Description of FIG. 11

FIG. 11 illustrates example activity flow when an event application client is used to edit an event in a computing environment similar to that shown in FIG. 1, according to some example embodiments.

The user opens an event at operation 1102 in the event application client (e.g., Outlook client), and through operations 1104-1108, the event application information (e.g., Outlook event information) is retrieved from the event application server (e.g., Outlook server). The event application server, upon being requested for the information, may retrieve the information related to a requested event from a DBMS or other data storage.

The information received from the event application server includes the CMS ID associated with the event. This is obtained from the received information in operation 1110.

Using the CMS ID, the event application client or a plugin for the event application (e.g., Outlook client plugin), at operations 1112-1116 communicates with the web application server component to obtain the stored corresponding CMS event information. As described above in relation to FIG. 2 and/or FIG. 11, the web application stores the event information in a storage in association with a CMS ID, and can therefore efficiently access previously stored event information using a specified CMS ID.

At operation 1118, the scheduled event is displayed for editing in the event application client. The scheduled event may be displayed in a screen such as screen 1202 shown in FIG. 12. One or more fields in the displayed screen may be made editable.

After the editing in operation 1122, at operation 1124, the event application aspects (e.g., Outlook aspects) and the web application aspects (e.g., CMS and/or IR Insight aspects) of the event are determined. At operations 1126 and 1128, in a manner similar to that discussed in relation to FIG. 2, the event information is stored by the event application server and the web application server. The stored event application event information is related to the corresponding stored web application event information by the CMS ID, a copy of which may be stored with the event application event information.

Figure 12:
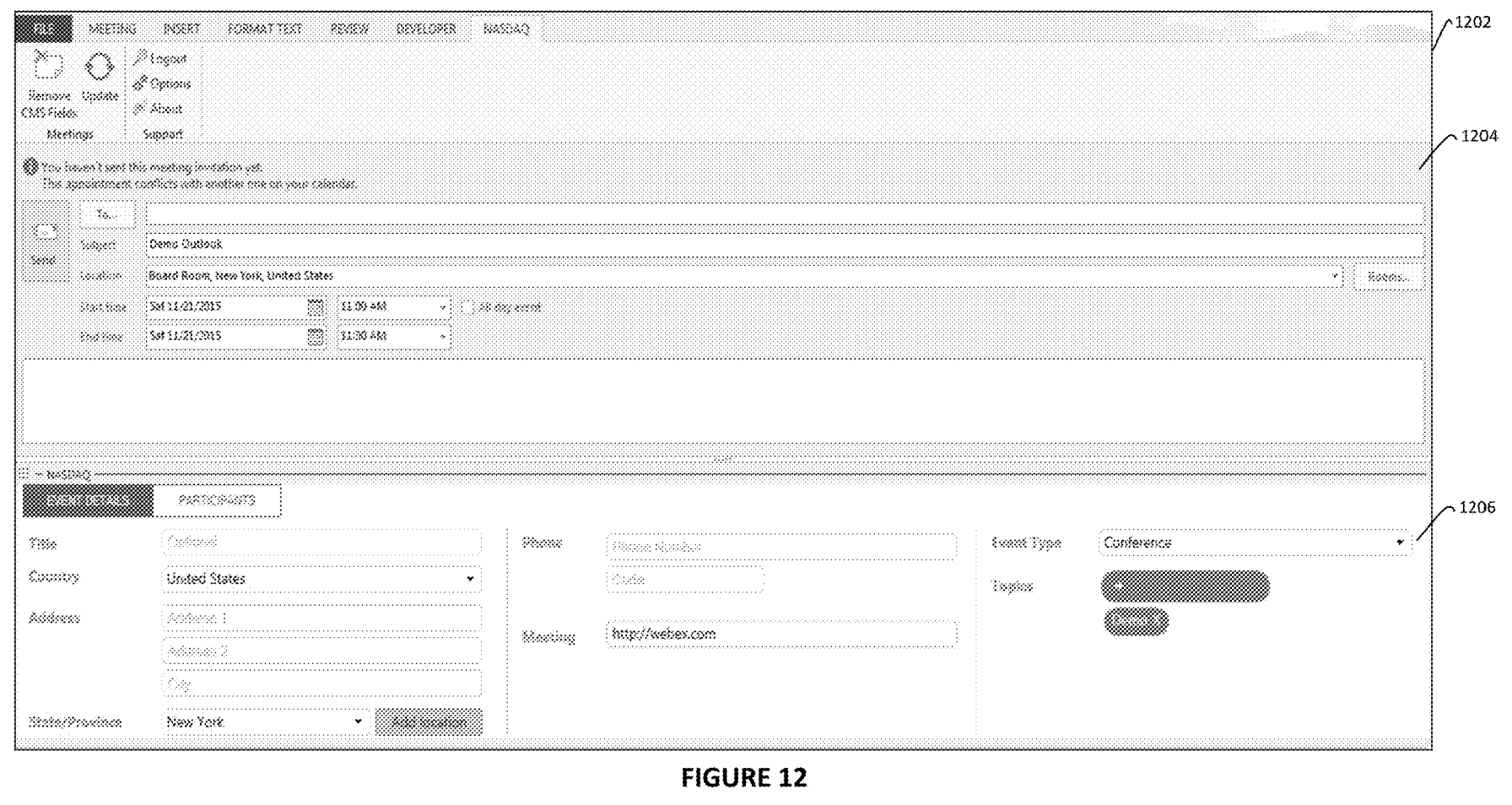

Description of FIG. 12

FIG. 12 illustrates a data entry screen 1202 for editing an event, according to some example embodiments. Event application event information may be provided in an event application panel 1204, and web application event information may be provided in a web application panel 1206.

One or more of the items of information regarding the event may be editable, while others may be shown as non-editable.

A toolbar may include inputs such as buttons etc. for functions such as converting the event from an event application-web application type of event (e.g., Outlook-CMS event) to an event application only event, causing synchronization between the event application events and web application events, etc.

Figure 13:
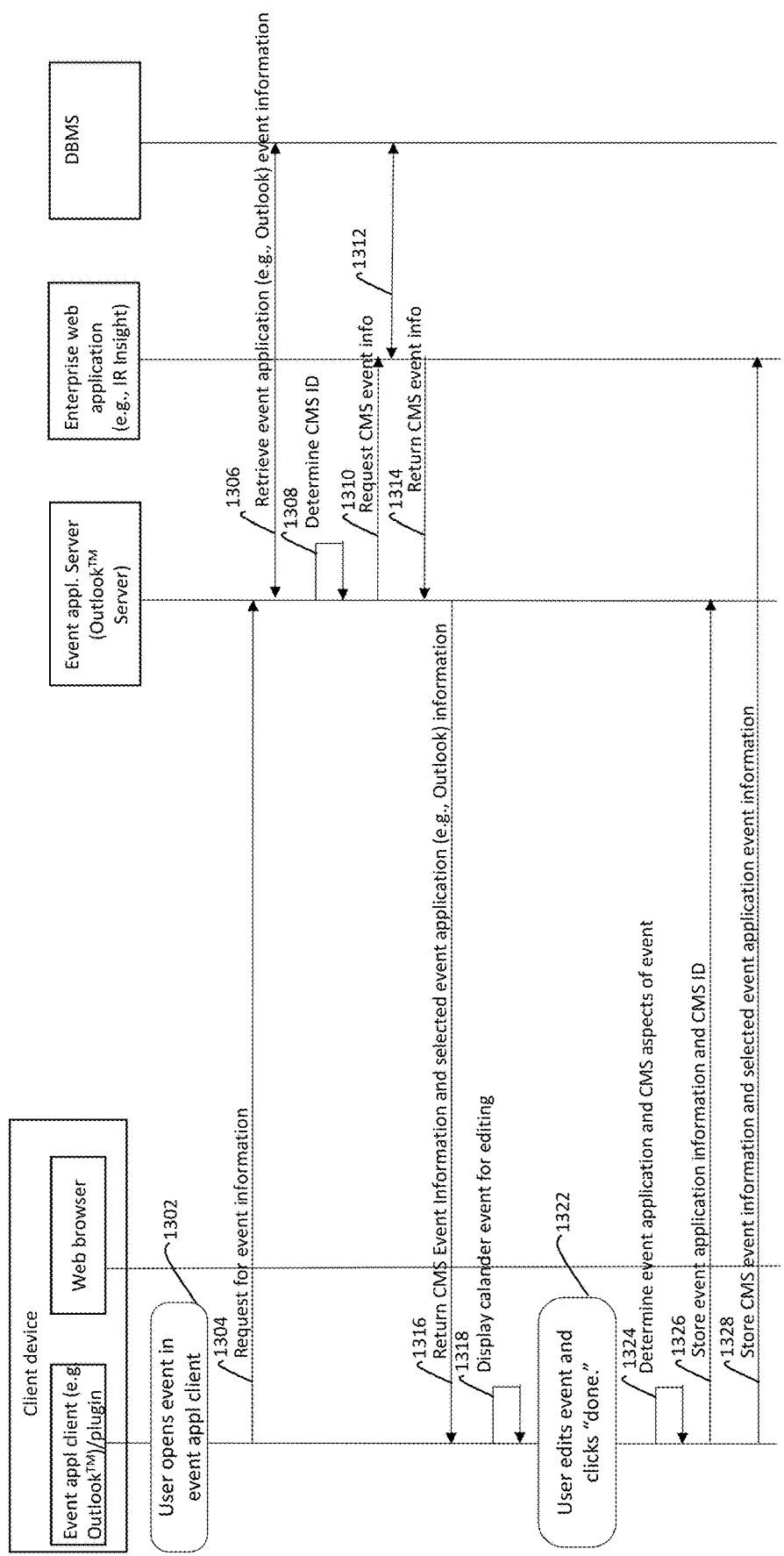
FIG. 13 illustrates example activity flow when the event application client is used to edit an event in a computing environment similar to that shown in FIG. 1, according to some example embodiments.

Description of FIG. 13

FIG. 13 illustrates example activity flow when the event application client is used to edit an event in a computing environment similar to that shown in FIG. 1, according to some example embodiments. In the embodiment shown in FIG. 13, the event application client (e.g., Outlook client), upon the user opening the event in the calendar at operation 1302, transmits the request for the event, and the event application server (e.g., Outlook server) includes the functionality to determine that the event is an event application-web application event (e.g., Outlook-CMS event), and to return event information for both the event application and web application (e.g. for both Outlook and IR Insight). Operations 1304-1318 illustrate this process.

At operations 1304, in a manner similar to operation 1104 described above, the event application client requests event information. At operation 1306, like in operation 1104, and the event application server obtains the event information associated with the event application from storage. Then, in contrast to the process described in FIG. 11 where the event application client controlled how the event information related to the web application (e.g., CMS information) is obtained, at operation 1308, the event application server determines whether the event type corresponds to an event in conjunction with a web application, and determines the CMS ID. Then at operations 1310-1314, the event application server controls obtaining the event information using the determined CMS ID.

Operations 1316-1318, in a manner similar to operations 1116-1118, provides the event application client with event information, and the event information is displayed for facilitating editing.

After the user edits the displayed event information at operation 1322, at operations 1324-1328, in a manner similar to operations 1124-1128, the edited event information is transmitted to the servers for storing.

Figure 14:
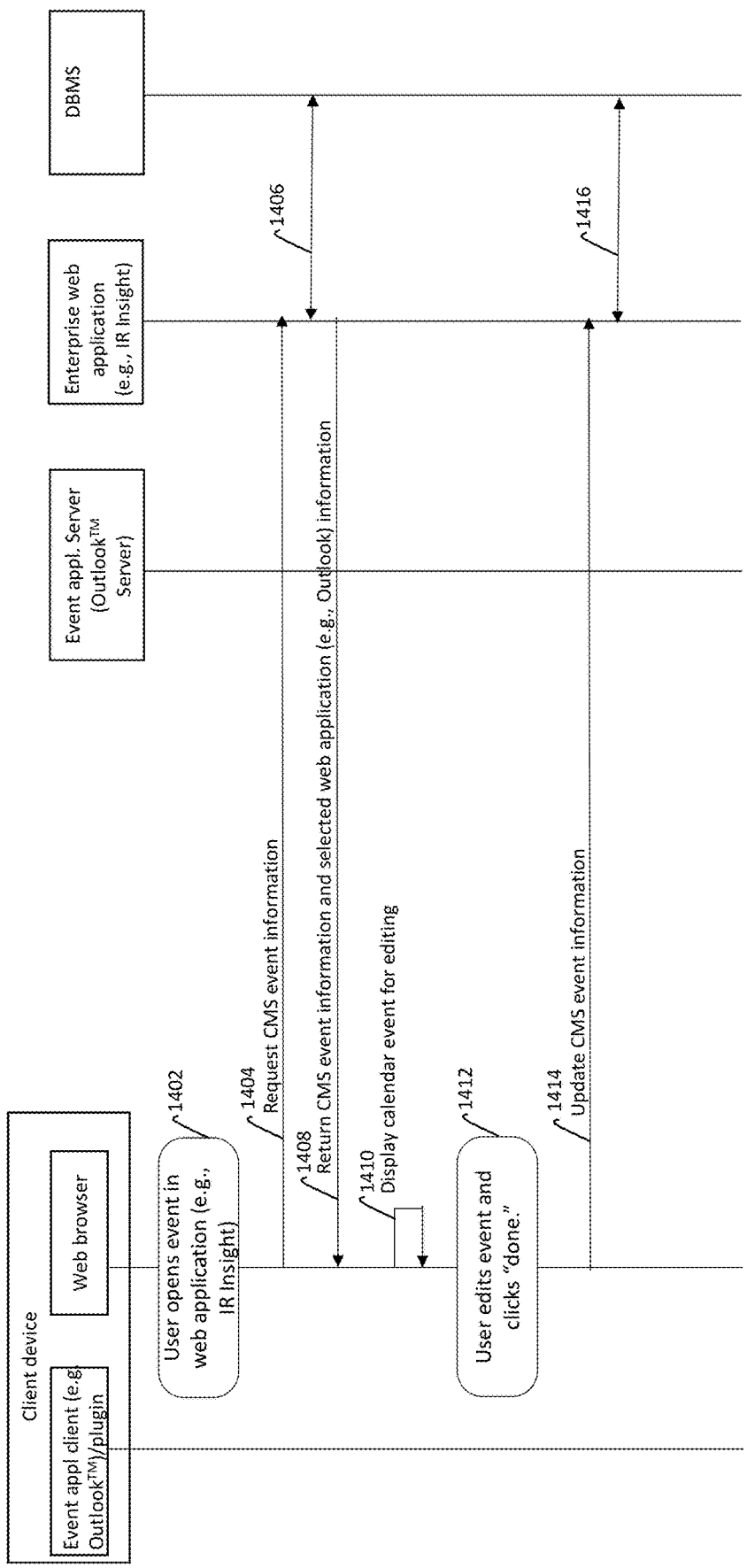
FIG. 14 illustrates example activity flow when the web application client is used to edit an event in a computing environment similar to that shown in FIG. 1, according to some example embodiments.

Description of FIG. 14

Whereas FIGS. 11 and 13 illustrated example activity flow when event information is edited by an event application client, FIG. 14 illustrates example activity flow when the web application client is used to edit an event in a computing environment similar to that shown in FIG. 1, according to some example embodiments.

After the user has logged into the web application, he/she may open a scheduled event in the web application client (e.g., web browser with IR Insight client plugin) at operation 1402. Then, at operations 1404-1406, the CMS event information is returned to the web application client from the web application server.

At operation 1410, the calendar is displayed and at operation 1412 the event is edited.

At operation 1414, the event information, including any updated event information, is provided to the web application server, and at operation 1416, the information is stored in a DBMS.

The editing of an event in the web application client may not, as shown in FIG. 14, trigger changes in a corresponding event application event information. The propagation of any necessary changes to the corresponding event application event information would occur during a subsequent event synchronization.

Figure 15:
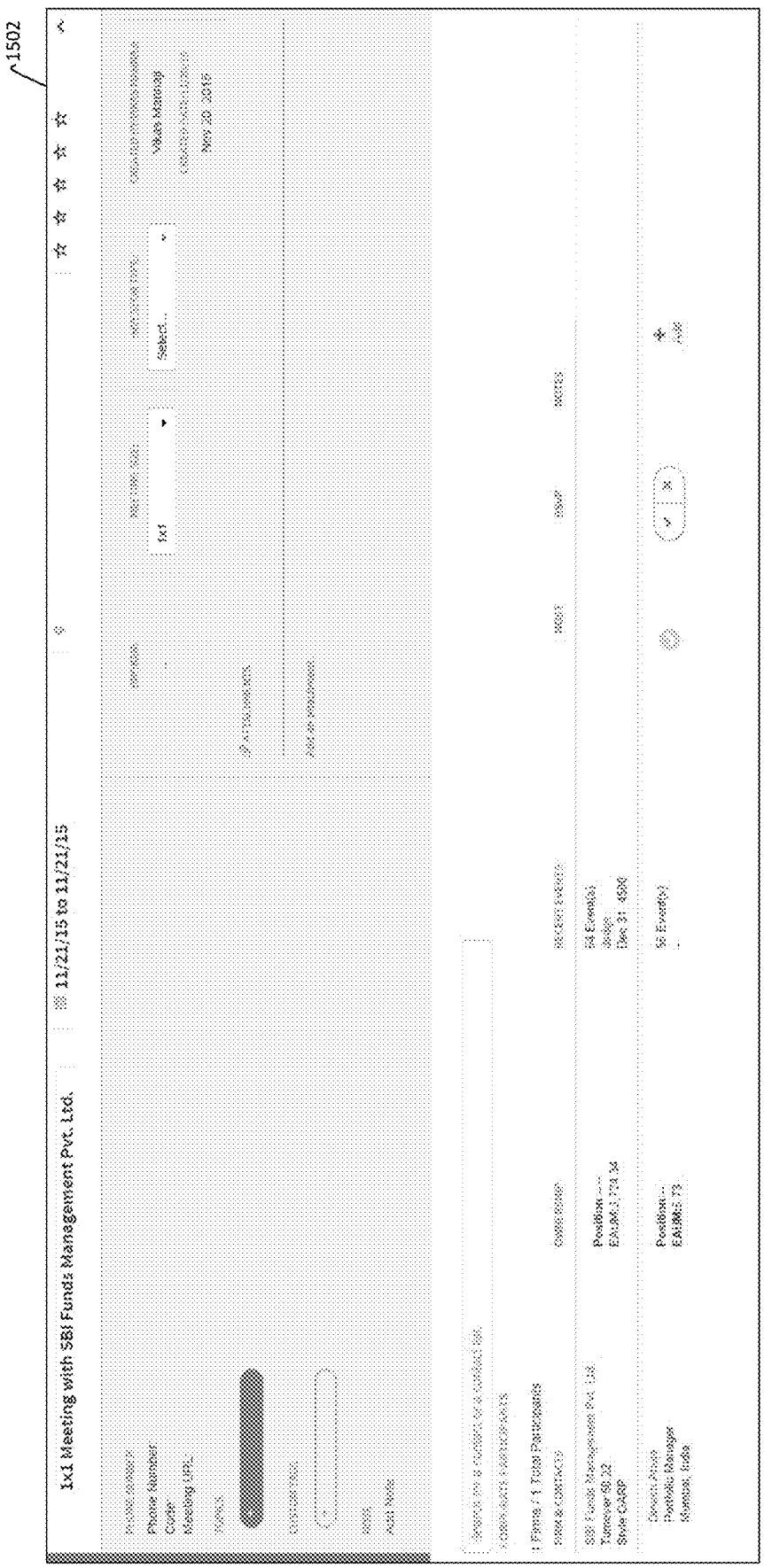
FIG. 15 illustrates a data entry window for editing an event, according to some example embodiments.

Description of FIG. 15

FIG. 15 illustrates a data entry window 1502 for editing an event from a web application, according to some example embodiments. Window 1502, like window 1002, displays similar information related to a scheduled event for editing.

In addition to various items discussed in relation to FIG. 10 above, window 1502 may also present a view as to how many events are scheduled for each of at least some participants. The participants may be shown organized by their affiliation. Moreover, the displayed information can include a summary of the events for which the organization and/or the participants have been registered. The summary may include a total number of all events, a total number of events of the same type as the current event.

Figure 16:
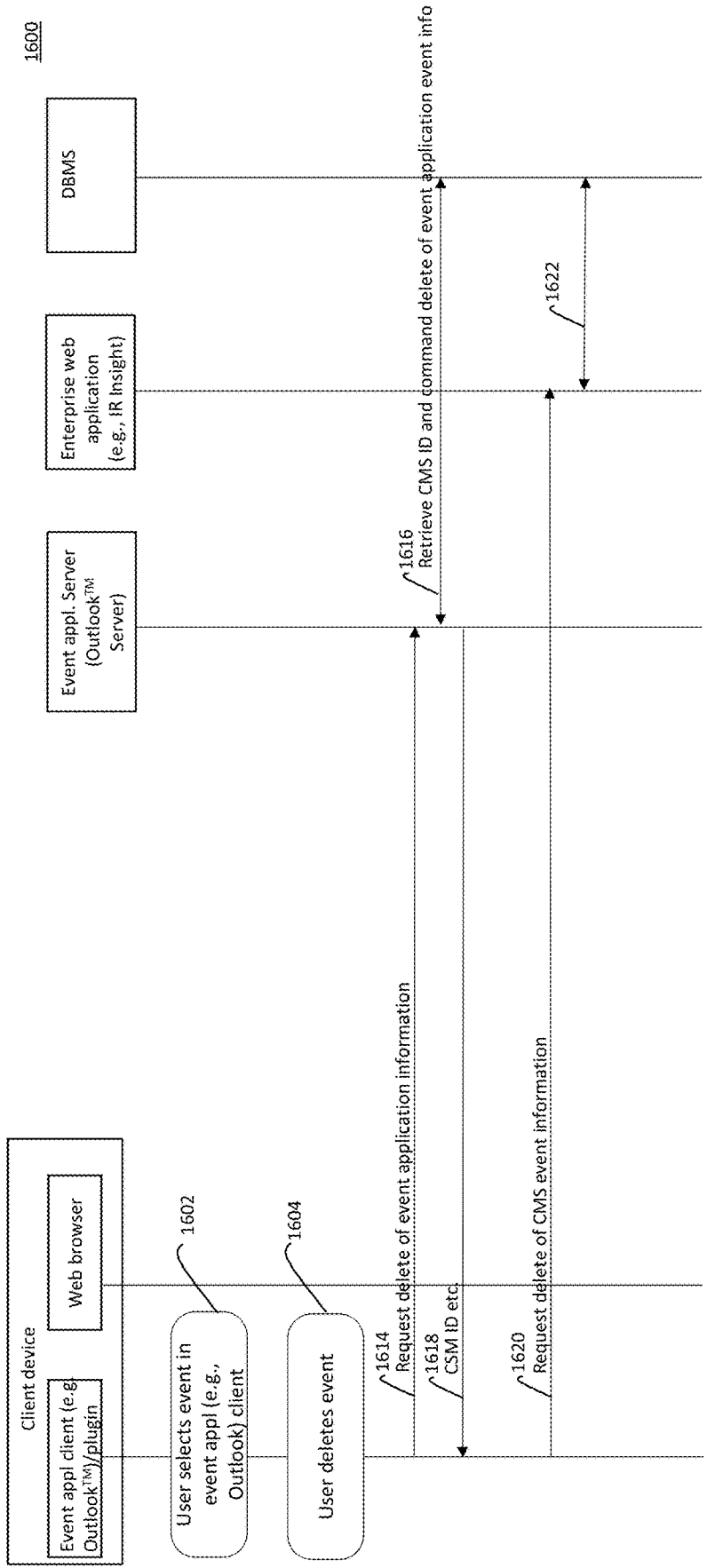
FIG. 16 illustrates example activity flow when the event application client is used to delete an event in a computing environment similar to that shown in FIG. 1, according to some example embodiments.

Description of FIG. 16

FIG. 16 illustrates an example activity flow 1600 that may occur when the event application client is used to delete an event in a computing environment similar to that shown in FIG. 1, according to some example embodiments. For example, activity flow 1600 may take place when an Outlook client with the plugin (e.g., email/event client 120 with plugin 124) is used to delete a previously scheduled event.

The user may commence a delete scheduled event operation by opening the event application client and viewing the calendar, for example, for a particular period. When the calendar is being viewed, at operation 1602, the user may select one of the displayed scheduled events to be deleted. Thereafter, at operation 1604, the user may command the event to be deleted.

Upon user command for deletion of the scheduled event, the event application client may at operation 1614 transmit a request to the event application server for requesting the deletion of the scheduled event. The scheduled vent may be identified by an event application event ID—a unique event identifier generated by the event application in a manner such that the event ID of a particular event is unique within the event application.

When the deletion request is received by the event application server, it proceeds at operation 1616 to delete the event application event information stored for the particular event application event ID.

Before the corresponding web application event information can be deleted, the event application client must have knowledge of the CMS ID associated with the scheduled event. According to some embodiments, the CMS ID is obtained from the event information that is already available to the event application client when the event is selected at operation 1602 before the deletion command is given at operation 1604.

In some other embodiments, when the CMS ID is not available to the event application client before that, at operation 1618, the event application client receives some event application event information from the event application server. The received information will also include the CMS ID.

At operation 1620, the event application client, which now has knowledge of the CMS ID, requests the web application server (e.g., IR Insight server, web application server 112*a*). At operation 1622, the web application server deletes the web application information from the DBMS. At this point the event may be considered as deleted.

Figure 17:
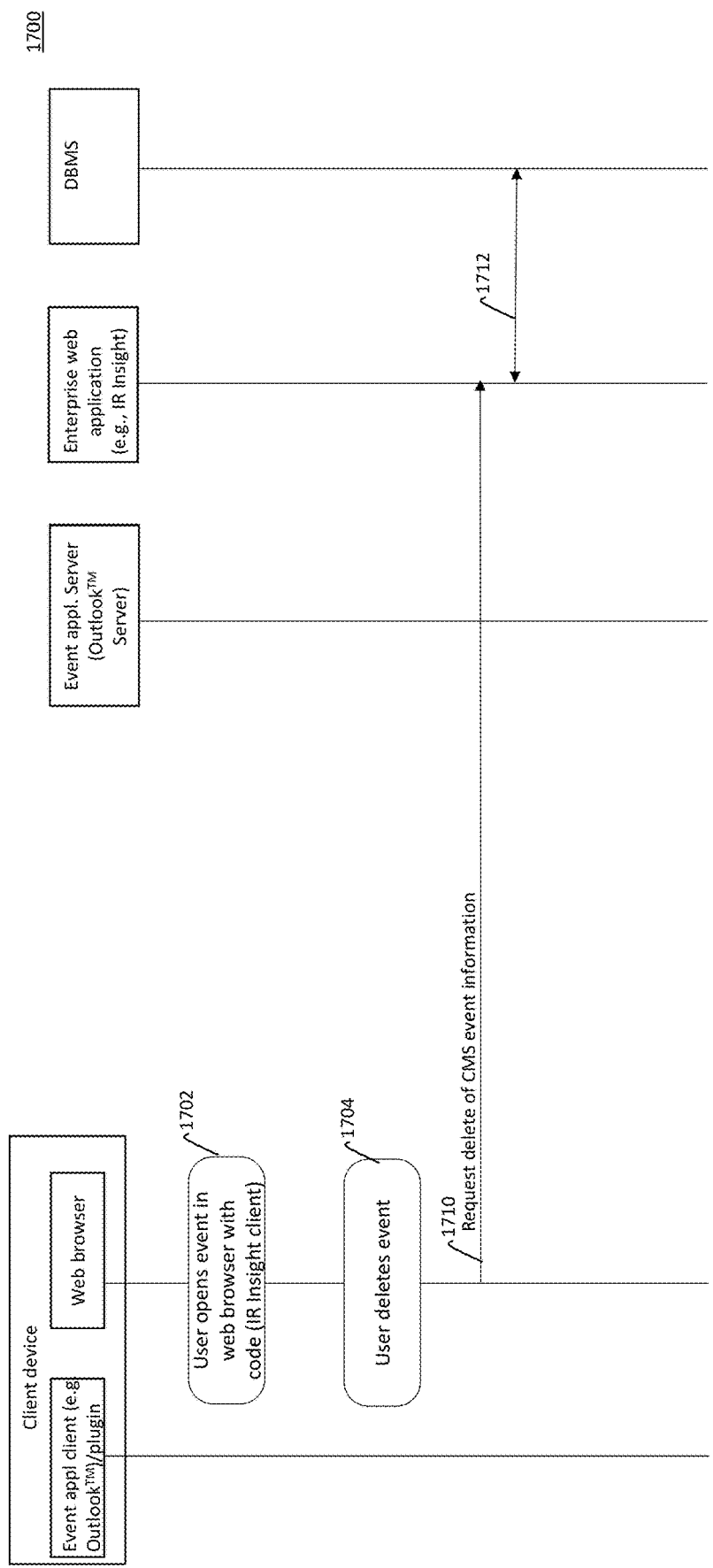
FIG. 17 illustrates example activity flow when the web application client is used to delete an event in a computing environment similar to that shown in FIG. 1, according to some example embodiments.

Description of FIG. 17

FIG. 17 illustrates example activity flow 1700 that may occur when the web application client is used to delete an event in a computing environment similar to that shown in FIG. 1, according to some example embodiments. For example, activity flow 1700 may take place when an IR Insight client (e.g., web browser 118 with client side code 120) is used to delete a previously scheduled event.

At operation 1702, the user may select a scheduled event in a calendar displayed by the web application, and at operation 1704 the user may select to delete the scheduled event.

Upon receiving the user's command to delete the scheduled event, the web application client, at operation 1710, instructs the web application server to delete the scheduled event. At operation 1712, the web application server deletes the selected scheduled event.

Figure 18:
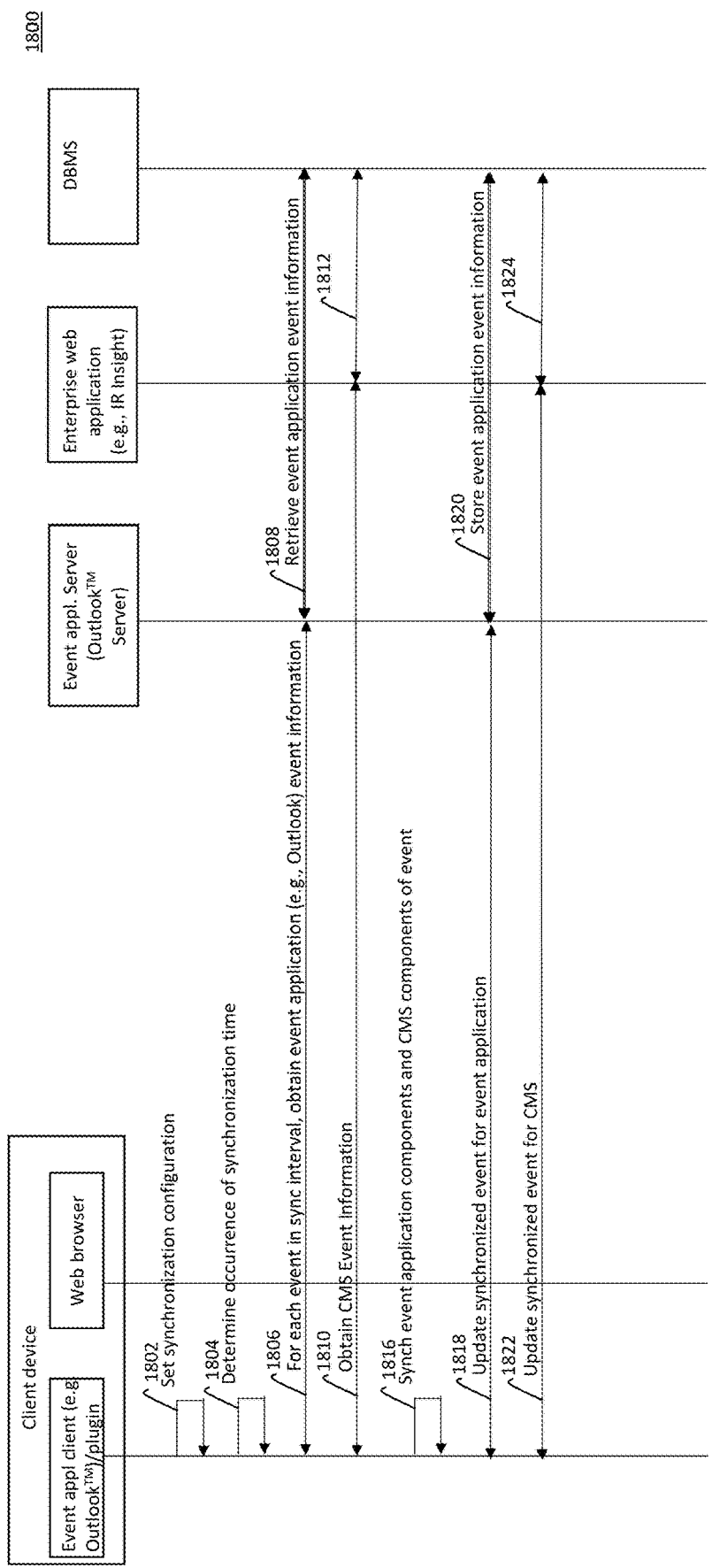
FIG. 18 illustrates example activity flow when the event application and web application synchronizes event information in a computing environment similar to that shown in FIG. 1, according to some example embodiments.

Description of FIG. 18

FIG. 18 illustrates example activity flow 1800 when the event application and web application synchronizes scheduled event information in a computing environment similar to that shown in FIG. 1, according to some example embodiments.

Some embodiments enable the synchronization to be configured. Configurable parameters may include how often the event application calendar is to be synchronized with the web application event schedule, and the length of time for which the synchronization is performed (e.g., synchronize events for the next two months etc.). In some embodiments, the synchronization frequency and the synchronization period may be set in accordance with the type of scheduled event: for example, one-on-one meetings may be synchronized every four hours or the like, but large meetings may be synchronized every 1 hour. Some embodiments may also allow different synchronization schedules for different users. A system administrator and/or user may set configuration parameters in a manner that optimizes the computing power expended while maintaining a desired level of synchronization between the event application calendar and web application schedule of events. The user performs configuration at operation 1802.

In the illustrated embodiment, the synchronization is controlled by the event application client plugin. At operation 1804, the event application client determines that, according to a predetermined schedule, a synchronization is to be performed.

At operations 1806-1808, the event application client requests and obtains the event application server to return all events consistent with the configured synchronization parameters. For example, where the synchronization period is two months, all scheduled events for the next two months from the current date are requested.

Then, for each scheduled event retrieved, operations 1810-1824 are used to synchronize with corresponding web application event information. For example, a CMS ID for each event application scheduled event is determined if available, from the retrieved information.

Based upon a determined CSM ID, the event application client requests the web application server for corresponding event information. The requesting and obtaining of corresponding web application event information is performed at operations 1810-1812.

At operation 1816, the event information for a scheduled event from the event application is synchronized with the event information for a corresponding scheduled event from the web application. Synchronization may include changing the web application event information to be consistent with the corresponding event application event information, and adding web application event information corresponding to each event application for which there does not exist a corresponding web application event. For example, whereas in some embodiments, the location, date and time of event as specified in the event application is stored together with the web application event information, these are updated whenever a change has been made in the event information of the event application. Another synchronization aspect may be to untag (de-identify, for example, by removing the CMS tag) event application scheduled events as event application-web application events when the corresponding web application event has been deleted (or cannot be found).

In still some other example embodiments, the synchronization includes receiving information for scheduled web application events during the synchronization period, and, for each web application event that is of a particular one or more event types and for which no corresponding event application event exists, creating a corresponding event application-web application event that is displayed in the event application calendar.

Operations 1818-1820, the synchronized events for the event application are stored by transmitting them from the event application client to the event application server. Synchronized events for the web application are stored at operations 1822-1824 by transmitting them from the event application client to the web application server.

Figure 19:
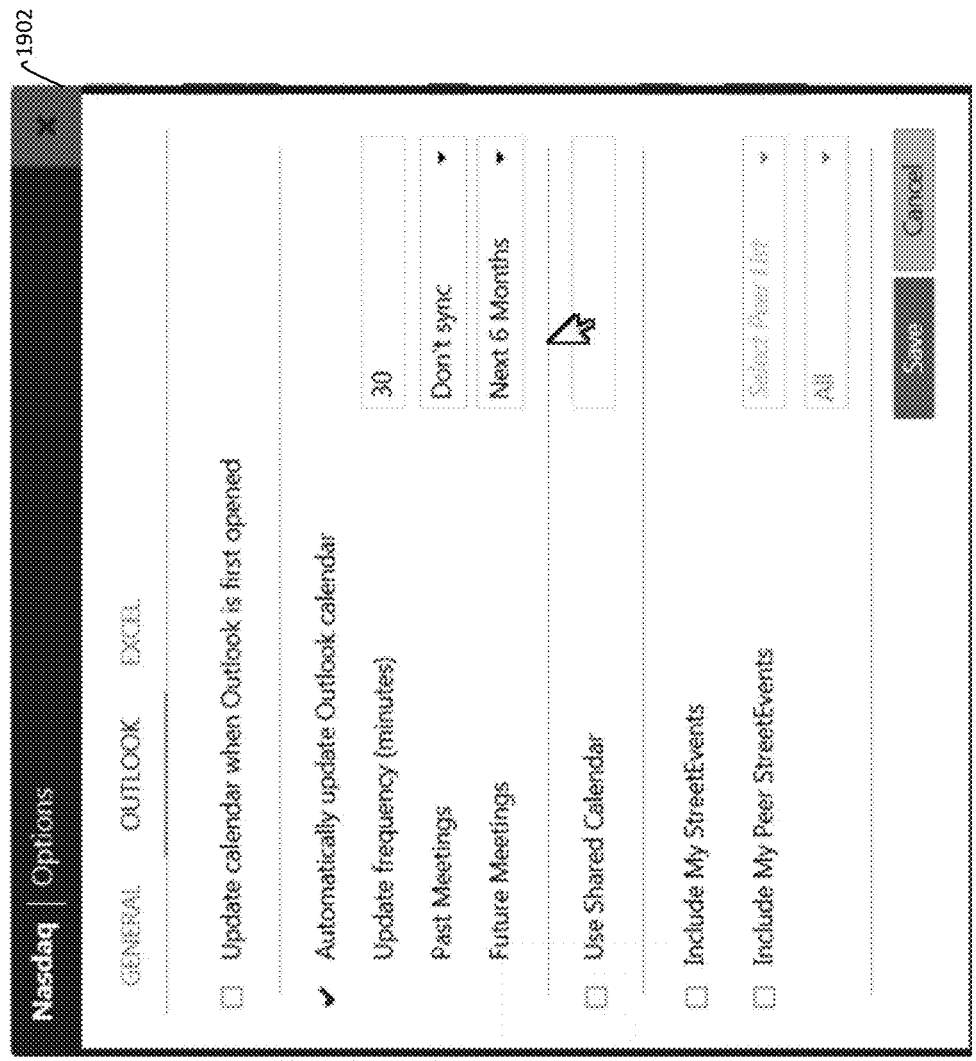
FIG. 19 illustrates a window for configuring synchronization, according to some example embodiments.

Description of FIG. 19

FIG. 19 illustrates a window 1902 for configuring synchronization, according to some example embodiments. In the example window 1902, automatic synchronization can be configured by providing an update frequency, whether or not to synchronize past events, and the synchronization period can be configured.

Figure 20:
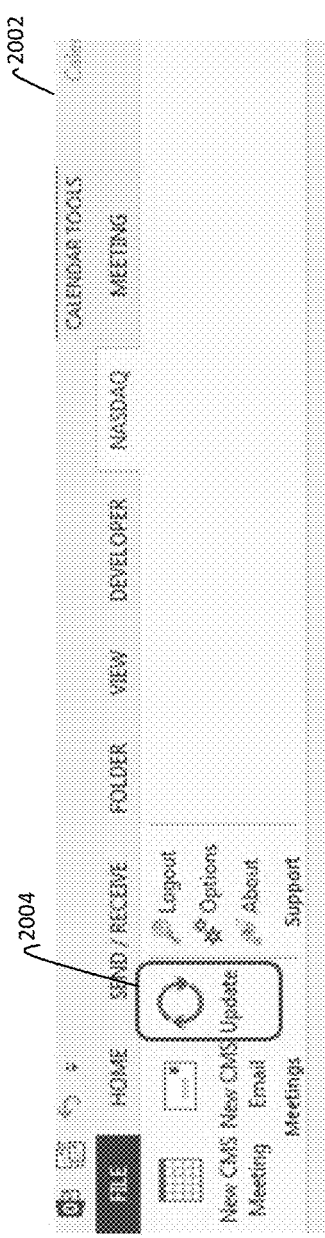
FIG. 20 illustrates a toolbar for configuring synchronization, according to some example embodiments.

Description of FIG. 20

FIG. 20 illustrates a toolbar 2002 for configuring synchronization, according to some example embodiments. By pressing an "update" button 2004, the user can initiate synchronization of scheduled events at any time. The synchronization may be performed by a process such as that discussed in relation to FIG. 18.

Figure 21:
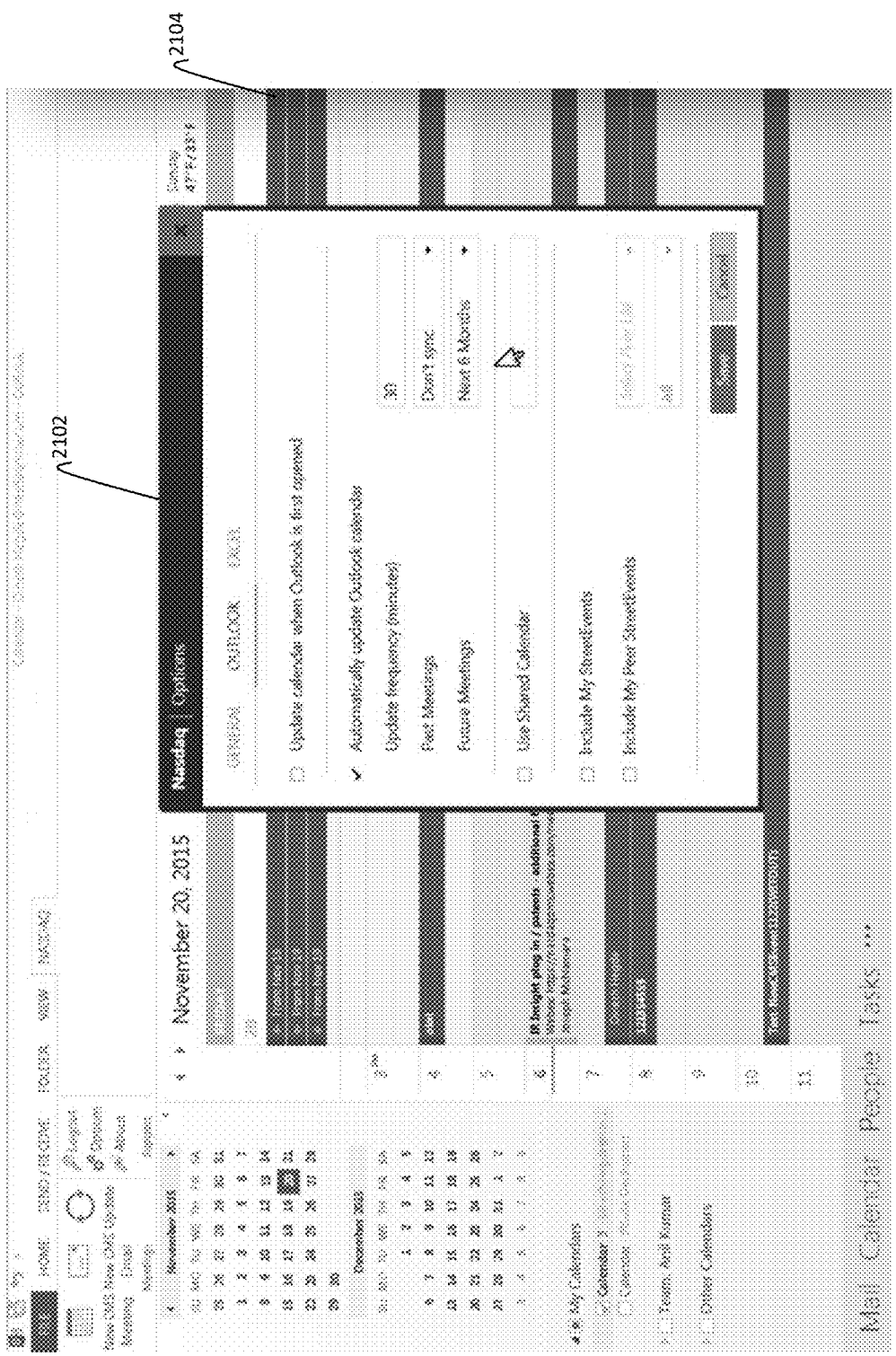
FIG. 21 illustrates a window for configuring synchronization displayed overlaying the displayed event application client calendar, according to some example embodiments.

Description of FIG. 21

FIG. 21 illustrates a window 2102 for configuring synchronization displayed overlaying the displayed event application client calendar 2104, according to some example embodiments.

Figure 22:
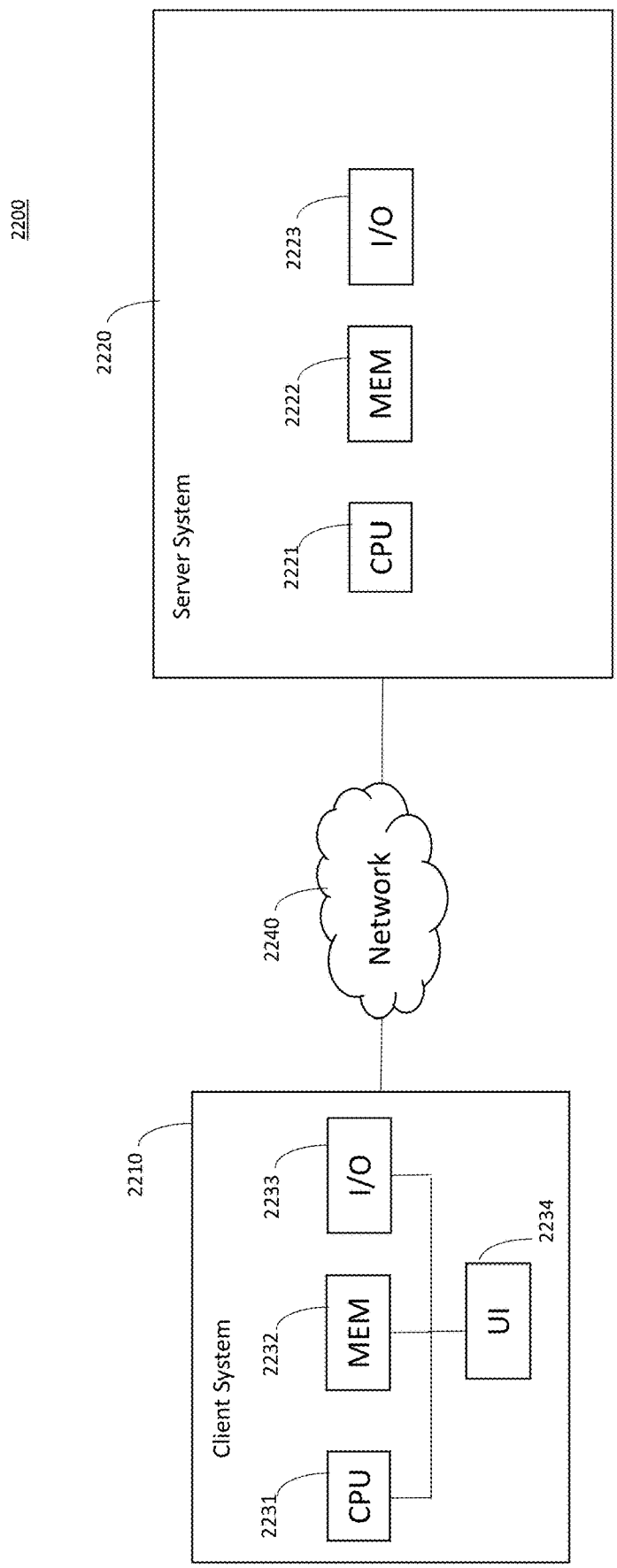
FIG. 22 schematically illustrates a computing environment in which the client devices and/or servers can be implemented, in accordance with some example embodiments.

Description of FIG. 22

FIG. 22 shows a non-limiting example block diagram of a hardware architecture for the system 100 shown in FIG. 1. In the example shown in FIG. 22, the client system 2210 communicates with a server system 2220 via a network 2240. The network 2240 could comprise a network of interconnected computing devices, such as the internet. The network 2240 could also comprise a local area network (LAN) or could comprise a peer-to-peer connection between the client system 2210 and the server system 2200.

The example client system 2210 and server system 2200 could correspond to clients 104 and server 102 as shown in FIG. 1. That is, the hardware elements (for example, electronic circuits or combinations of circuits) described in FIG. 22 could be used to implement the various software components and actions shown and described herein with reference to FIG. 1. For example, the client system 2210 in FIG. 22 could include at least one processor CPU 2231, at least one memory (or digital storage device) 2232, at least one input/output device I/O 2233, and a component for generating and displaying a user interface UI 2234. The at least one memory 2232 may include a computer readable storage medium such as, for example, random access memory (RAM), static RAM, flash memory, magnetic disk. The I/O device 2233 can be all encompassing and could include a communication device, such as a transceiver for sending and receiving data (e.g., a wireless transceiver, a wired transceiver). I/O device 2233 could also include an interface for connecting a non-transitory computer readable storage medium to the client system 2210 to send and receive data.

It should be appreciated that the combination of elements in client system 2210 could be used to implement the example web browser applications 118 and application client 120 in FIG. 1. For example, the memory 2232 could load the files associated with the application (e.g., HTML, XML, JavaScript files) and the CPU 2231 could be used to execute instructions associated with the application. The I/O device 2233 could be utilized to fetch the various elements comprising the SPA from the server system 2220 and/or to interact with the user.

Server system 2220 also comprises various hardware components used to implement the software elements for server 102 as shown in FIG. 1. For example, server system 102 could also include hardware components of at least one processor CPU 2221, at least one memory 2222, and at least one input/output device I/O 2223. The at least one memory 2222 may include a computer readable storage medium such as, for example, random access memory (RAM), static RAM, flash memory, magnetic disk. The I/O device 2223 can be all encompassing and could include a communication device, such as a transceiver for sending and receiving data (e.g., a wireless transceiver, a wired transceiver, a network interface). I/O device 2223 could also include an interface for connecting a non-transitory computer readable storage medium to the server system 2200 to send and receive data.

In one example embodiment, I/O device 2233 of the client system can perform communication via the network with I/O device 2223 of the server system.

Similar to client system 2210, the server system 2220 could implement and/or execute the applications. For example, the memory 2222 could be used to store the information in database 110 as well as the components and files utilized by web servers and application servers associated with, for example, the web applications 112, core services 106, email servers 114. The CPU 2221 could be used in executing the software necessary to generate the respective modules that are requested by and transmitted to the client system 2210. For example, CPU 2221 could be used to generate the necessary modules created by an application server. Likewise, I/O device 2223 can be used by a web server to transmit the different application elements to the client system 2210. Of course, these examples are non-limiting and the system envisions utilizing the hardware elements in a variety of aspects.

In some embodiments, each or any of the CPUs 2221 and 2231 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 2221 and 2231 uses an instruction set architecture such as x86 or Advanced RISC Machine (ARM).

In some embodiments, each or any of the memory devices 2222 and 2232 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 2221 and/or 2231). Memory devices 2222 and 2232 may also include non-volatile computer-readable storage media.

In some embodiments, each or any of the network interface devices which may be provided as an I/O device 2223 and/or 2233 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces which may be provided as an I/O device 2223 and/or 2233 or in UI 2234 is or includes one or more circuits that receive data from the CPU 2221 or 2231, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to a display device which displays the image data. Alternatively or additionally, in some embodiments, each or any of the display interfaces is or includes, for example, a video card, video adapter, or graphics processing unit (GPU).

In some embodiments, each or any of user input adapters comprising user interface 2234 and/or I/O interfaces 2223 and 2233, is or includes one or more circuits that receive and process user input data from one or more user input devices (not separately shown in FIG. 22) that are included in, attached to, or otherwise in communication with the computing device(s), and that output data based on the received input data to the processors. Alternatively or additionally, in some embodiments each or any of the user input adapters is or includes, for example, a PS/2 interface, a USB interface, a touchscreen controller, or the like; and/or the user input adapters facilitates input from user input devices (not shown in FIG. 22) such as, for example, a keyboard, mouse, trackpad, touchscreen, etc.

In some embodiments, a display device such as, but not limited to, one included in UI 2234, may be a Liquid Crystal Display (LCD) display, Light Emitting Diode (LED) display, or other type of display device. In embodiments where the display device is a component of the computing device (e.g., the computing device and the display device are included in a unified housing), the display device may be a touchscreen display or non-touchscreen display. In embodiments where the display device is connected to the computing device (e.g., is external to the computing device and communicates with the computing device via a wire and/or via wireless communication technology), the display device is, for example, an external monitor, projector, television, display screen, etc.

In various embodiments, each computing device 2210 and 2220 includes one, or two, or three, four, or more of each or any of the above-mentioned elements (e.g., the processors 2231 and 2221, memory devices 2232 and 2222, I/O interfaces 2233 and 2223, and UI 2234). Alternatively or additionally, in some embodiments, each computing device includes one or more of: a processing system that includes the processors 2231 and/or 2221; a memory or storage system that includes the memory devices 2232 and/or 2222; and a network interface system that includes the I/O devices 2233 and/or 2223.

The computing devices 2210 and/or 2220 may be arranged, in various embodiments, in many different ways. As just one example, the computing device may be arranged such that the processors include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

As previously noted, in some embodiments, client system 2210 could be used to implement the client device 104 and components such as web browser applications 118 and application client 120 shown in FIG. 1. In some embodiments, server system 2220 may implement server infrastructure 102 including components such as database 110, web applications 112, core services 106, email servers 114 etc. Whenever it is described in this document that a software module or software process performs any action, the action is in actuality performed by underlying hardware elements according to the instructions that comprise the software module. In such embodiments, the following applies for each component: (a) the elements of the computing devices 2210 and/or 2220 shown in FIG. 22, or appropriate combinations or subsets of the elements, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices (e.g., in various embodiments, in a volatile memory device such as a RAM or an instruction register and/or in a non-volatile memory device such as a flash memory or hard disk) and all actions described herein as performed by the software modules are performed by processors in conjunction with, as appropriate, the other elements in and/or connected to the computing device (i.e., the network interface devices, display interfaces, user input adapters, and/or display device; (c) alternatively or additionally, to the extent it is described herein that the component processes and/or otherwise handles data, in some embodiments, such data is stored in memory devices (e.g., in some embodiments, in a volatile memory device such as a RAM and/or in a non-volatile memory device such as a flash memory or hard disk) and/or is processed/handled by the processors in conjunction, as appropriate, the other elements in and/or connected to the computing device (i.e., the network interface devices, display interfaces, user input adapters, and/or display device); (d) alternatively or additionally, in some embodiments, the memory devices store instructions that, when executed by the processors, cause the processors to perform, in conjunction with, as appropriate, the other elements in and/or connected to the computing device (i.e., the memory devices, network interface devices, display interfaces, user input adapters, and/or display device), each or any combination of actions described herein as performed by the component and/or by any software modules described herein as included within the component.

The hardware configurations shown in FIG. 22 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 22, (e) via other hardware arrangements, architectures, and configurations, and/or via combinations of the technology described in (a) through (e).

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits (e.g., as shown in FIG. 22), using software programs (e.g., as shown in FIG. 1) and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Technical Advantages of Described Subject Matter

Certain example embodiments enable the integration of event schedules in enterprise web applications with other event scheduling applications. Such integration enables enterprise users to more efficiently include users outside of the interface in selected events and to maintain a single calendar with events scheduled in multiple resources. Certain example embodiments maintain event information in the enterprise web application and also in the non-enterprise application while minimizing duplication of information, and maintaining accurate synchronization of events. A single identifier to track the same event in multiple event scheduling systems enables efficient synchronization in the computer systems and also provides for more accurate linking between the two scheduling systems. Some embodiments also enable the enterprise user to benefit from certain aspects regarding scheduled events that are not configurable in the enterprise web application.

The technical features described herein may thus improve the usefulness of enterprise web applications by incorporating the capability to include users outside of the enterprise web application in events thereby increasing the group of persons who can be included in scheduled events and/or thereby improving the speed at which non-enterprise users can be included in scheduled events, and by providing enterprise users a unified schedule such that they can avoid the inefficiencies of having to monitor and switch back and forth between multiple separate calendars for events of interest. Moreover the technical features may improve the performance of the enterprise web application and the computer system executing the enterprise web application by speeding up the integration of non-enterprise users to event schedules.

Additional Applications of Described Subject Matter

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

While the technology has been described in relation to AngularJS, this is done for ease of description; it is to be understood that the technology described in this document is applicable in the context of other SPA technologies, other web technologies, and/or any other software technology.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A method of providing access to information regarding an electronically scheduled event, the method performed by at least one server, wherein a first application comprises a first server application process executing on the at least one server and communicating over a network with a first client application process executing on a client device, and wherein a second application comprises a second server application process executing on the at least one server and communicating over a network with a second client application process executing on the client device, and the method comprising:

receiving, by the first server application process, a first set of event information elements comprising information regarding the scheduled event set up in the first application;

receiving, by the second server application process, a second set of event information elements comprising information regarding the scheduled event in the second application, the second set of event information elements including at least one event information element that is not in the first set of event information elements;

based upon the received second set of event information elements, generating a unique event identifier representing the scheduled event;

storing the received second set of event information elements and a subset of the received first set of event information elements in a first storage area in association with the generated unique event identifier;

storing the received first set of event information elements and the generated unique event identifier in a second storage area different from the first storage area;

upon being requested by a client associated with the first application:

retrieving the stored first set of event information elements;

and using the generated unique event identifier stored with the first set of event information elements, retrieving the stored second set of event information elements; and transmitting to the client the retrieved first set of event information elements and the retrieved second set of event information elements for display in relation to the scheduled event, wherein the first application includes an email component and a first calendar management component integrated with the email component, and wherein the email component is operable to transmit notifications regarding the scheduled event to registered participants of the scheduled event who are users of the first application, and wherein the second application comprises a second contact management component for use by the second application, and wherein at least one of the registered participants of the scheduled event is registered by the second contact management component of the second application and is not a user of the first application.

2. The method according to claim 1, wherein the first set of event information elements includes information specifying a location for the scheduled event, and wherein the second set of event information elements includes further information specifying the location.

3. The method according to claim 2, wherein the first set of event information elements further includes information specifying a date and a time for the scheduled event.

4. The method according to claim 1, wherein the subset of information includes at least one of a date, a time, a subject, and the location associated with the scheduled event.

5. The method according to claim 1, wherein said retrieving the second set of event information elements comprises determining whether a user associated with the client is currently authorized to use the second application, and performing said transmitting to the client the retrieved second set of event information elements only when said determining determines that the user is currently authorized to use the second application.

6. The method according to claim 5, wherein the determination as to whether the user is currently authorized to use the second application is based upon whether or not the user is currently logged into the second application.

7. The method according to claim 1, wherein no portion of the second set of event information elements is stored in the second area where the first set of event information elements is stored.

8. The method according to claim 1, further comprising:
transmitting the generated unique event identifier to a sender from which the second set of event information elements was received,
wherein the first set of event information elements is received from the sender along with the transmitted generated unique event identifier.

9. The method according to claim 8, wherein the sender includes an event application client which transmits the first set of event information elements and the second set of event information elements to the at least one server.

10. The method according to claim 1, wherein a portion of a user interface providing the second set of event information is controlled by the second client application process.

11. A system comprising:
at least one digital storage device; and
at least one processor, communicably coupled to the the at least one digital storage device, and configured to perform actions comprising:
executing a first application and a second application, wherein the first application comprises a first server application process executing on the at least one server and communicating over a network with a first client application process executing on a client device, and wherein the second application comprises a second server application process executing on the at least one server and communicating over a network with a second client application process executing on the client device;
receiving, using the first server application process, first set of event information elements comprising information regarding a scheduled event set up in the first application;
receiving, using the second server application process, second set of event information elements comprising information regarding the scheduled event in the second application;
based upon the received second set of event information elements, generating a unique event identifier representing the scheduled event;
storing the received second set of event information elements in a first area of the at least one digital storage device in association with the generated identifier;
storing the received first set of event information elements and the generated identifier in a second area of the at least one digital storage device;
upon being requested by a client associated with the first application, retrieving the first set of event information elements, and using the generated identifier stored with the first set of event information elements, retrieving the second set of event information elements; and
transmitting, to the client, the retrieved first set of event information elements and the retrieved second set of event information elements for display in relation to the scheduled event,
wherein the first application includes an email component and a first calendar management component integrated with the email component, and wherein the email component is operable to transmit notifications regarding the scheduled event to registered participants of the scheduled event who are users of the first application, and
wherein the second application comprises a second contact management component for use by the second application, and wherein at least one of the registered participants of the scheduled event is registered by the second contact management component of the second application and is not a user of the first application.

12. The system according to claim 11, wherein the first set of event information elements includes information specifying a location for the scheduled event, and wherein the second set of event information elements includes further information specifying the location.

13. The system according to claim 11, wherein said retrieving the second set of event information elements comprises determining whether a user associated with the client is currently authorized to use the second application, and performing said transmitting to the client the retrieved second set of event information elements only when said determining determines that the user is currently authorized to use the second application.

14. The system according to claim 11, wherein no portion of the second set of event information elements is stored in the second area where the first set of event information elements is stored.

15. A computing device comprising:
a display screen;
an input device; and
at least one processor communicably coupled to the display screen or the input device and configured to perform actions that include:
in response to a user input requesting display of a scheduled event, transmitting a request for first set of event information elements to a server component of a first application executing on at least one server, wherein the first application comprises a first server application process executing on the at least one processor and communicating over a network with a first client application process executing on the computing device;

receiving the first set of event information elements and a unique event identifier from the first server application process at the at least one server;

transmitting the received unique event identifier to a server component of a second application executing on the at least one server, the second application comprising a second server application process executing on the at least one processor and communicating over a network with a second client application process executing on the computing device, wherein the second application is different from the first application;

receiving second set of event information elements associated with the unique identifier from the second server application process at the at least one server, wherein the second set of event information elements and a subset of the first set of event information elements are stored in a first storage area in association with the unique event identifier, and the first set of event information elements and the unique event identifier are stored in a second storage area different from the first storage area;

displaying aspects of the received first set of event information elements in a first data entry panel on the display screen; and displaying aspects of the received second set of event information elements in a second data entry panel on the display screen simultaneously with the first data entry panel, wherein the first application includes an email component and a first calendar management component integrated with the email component, and wherein the email component is operable to transmit notifications regarding the scheduled event to registered participants of the scheduled event who are users of the first application, wherein the second application comprises a second contact management component for use by the second application, and wherein at least one of the registered participants of the scheduled event is registered by the second contact management component of the second application and is not a user of the first application, and wherein the at least one server, upon being requested by the computing device in association with the first application:

retrieves the stored first set of event information elements;

and using the unique event identifier stored with the first set of event information elements, retrieves the stored second set of event information elements; and transmits to the computing device the retrieved first set of event information elements and the retrieved second set of event information elements for display in relation to the scheduled event.

16. The computing device according to claim 15, wherein the actions further include:

when a user using the second client is not logged into the second application, preventing said displaying the second data entry panel; and when a user using the second client is logged into the second application, performing said displaying the second data entry panel.

17. The computing device according to claim 15, wherein the first set of event information elements includes information specifying a location for the scheduled event, and wherein the second set of event information elements includes further information specifying the location.

18. The computing device according to claim 15, wherein said retrieving the second set of event information elements comprises determining whether a user associated with the client is currently authorized to use the second application, and performing said transmitting to the client the retrieved second set of event information elements only when said determining determines that the user is currently authorized to use the second application.

19. The computing device according to claim 15, wherein no portion of the second set of event information elements is stored in the second area where the first set of event information elements is stored.

* * * * *